United States Patent
Sanders et al.

(10) Patent No.: US 11,029,817 B2
(45) Date of Patent: **\*Jun. 8, 2021**

(54) INTELLIGENT MEDIA QUEUE

(71) Applicant: Apple Inc., Cupertino, CA (US)

(72) Inventors: Christopher John Sanders, San Jose, CA (US); Anne Jones, Emerald Hills, CA (US); Jeffrey L. Robbin, Los Altos, CA (US); William Martin Bachman, San Jose, CA (US); Timothy B. Martin, Sunnyvale, CA (US)

(73) Assignee: Apple Inc., Cupertino, CA (US)

( \* ) Notice: Subject to any disclaimer, the term of this patent is extended or adjusted under 35 U.S.C. 154(b) by 185 days.

This patent is subject to a terminal disclaimer.

(21) Appl. No.: 16/141,574

(22) Filed: Sep. 25, 2018

(65) Prior Publication Data

US 2019/0025993 A1 Jan. 24, 2019

Related U.S. Application Data

(63) Continuation of application No. 15/182,902, filed on Jun. 15, 2016, now Pat. No. 10,120,533, which is a continuation of application No. 13/609,169, filed on Sep. 10, 2012, now abandoned.

(51) Int. Cl.
| | |
|---|---|
| *G06F 3/0482* | (2013.01) |
| *G06F 3/0484* | (2013.01) |
| *G06F 16/638* | (2019.01) |
| *G06F 16/438* | (2019.01) |
| *G06F 3/16* | (2006.01) |

(52) U.S. Cl.
CPC .......... *G06F 3/0482* (2013.01); *G06F 3/0484* (2013.01); *G06F 3/04842* (2013.01); *G06F 3/165* (2013.01); *G06F 16/4387* (2019.01); *G06F 16/639* (2019.01)

(58) Field of Classification Search
CPC ...... G06F 3/0482; G06F 3/0484; G06F 3/165; G06F 3/04842; G06F 16/639; G06F 16/4387
See application file for complete search history.

(56) References Cited

U.S. PATENT DOCUMENTS

| | | | | |
|---|---|---|---|---|
| 1,970,417 A | * | 8/1934 | Dahlstrom | G11B 17/24 369/37.01 |
| 7,933,670 B2 | * | 4/2011 | Pickford | A63F 13/493 700/94 |
| 8,148,622 B2 | * | 4/2012 | Rothkopf | H04N 21/482 84/615 |

(Continued)

OTHER PUBLICATIONS

"Slipping a New Song Into a Downloaded Playlist for Effortless Previewing of New Songs," IBM, Apr. 9, 2007.

*Primary Examiner* — Justin R. Blaufeld
(74) *Attorney, Agent, or Firm* — Blank Rome LLP

(57) ABSTRACT

Systems, methods, and non-transitory computer-readable storage media for intelligently managing a playlist of digital media provide an intelligent dynamic queue that is configured to manage the playback of digital media. The queue can transition between passive playback mode, active playback mode, and mixed playback mode. The queue can handle the playback of the songs in the queue according to the playback mode and/or a queue status field that is associated with each song in the queue.

20 Claims, 16 Drawing Sheets

(56) References Cited

U.S. PATENT DOCUMENTS

| | | | | |
|---|---|---|---|---|
| 8,185,584 B2* | 5/2012 | Fischer | G06Q 10/10 | 709/204 |
| 8,214,740 B2 | 7/2012 | Johnson | | |
| 8,224,927 B2* | 7/2012 | Lydon | G06F 16/4387 | 709/218 |
| 8,612,882 B1* | 12/2013 | Dontcheva | G06F 16/24522 | 715/790 |
| 10,120,533 B2* | 11/2018 | Sanders | G06F 3/0484 | |
| 2005/0195435 A1* | 9/2005 | Kojima | H04N 1/2175 | 358/1.16 |
| 2006/0195521 A1* | 8/2006 | New | H04L 63/105 | 709/204 |
| 2007/0025194 A1* | 2/2007 | Morse | G06F 16/9535 | 369/30.1 |
| 2008/0189318 A1 | 8/2008 | Bourke | | |
| 2008/0288536 A1* | 11/2008 | Pfeiffer | G06F 16/4387 | |
| 2009/0055759 A1* | 2/2009 | Svendsen | H04L 67/104 | 715/764 |
| 2009/0217804 A1* | 9/2009 | Lu | G06F 16/686 | 84/602 |
| 2009/0249222 A1 | 10/2009 | Schmidt | | |
| 2009/0327349 A1* | 12/2009 | Fukuda | G06F 16/686 | |
| 2010/0070490 A1* | 3/2010 | Amidon | G06F 16/4387 | 707/722 |
| 2010/0094820 A1* | 4/2010 | Purdy | G06F 16/4387 | 707/705 |
| 2010/0228740 A1* | 9/2010 | Cannistraro | G06F 16/686 | 707/748 |
| 2011/0004330 A1* | 1/2011 | Rothkopf | G06F 3/0482 | 700/94 |
| 2011/0283236 A1* | 11/2011 | Beaumier | G06F 3/0481 | 715/835 |
| 2012/0003966 A1* | 1/2012 | Lee | G06F 16/4387 | 455/414.1 |
| 2012/0185771 A1* | 7/2012 | Rothkopf | G06F 16/4387 | 715/716 |
| 2013/0219273 A1* | 8/2013 | Coburn | G06F 3/0484 | 715/716 |
| 2013/0254207 A1* | 9/2013 | Coburn, IV | G06F 16/4387 | 707/740 |
| 2013/0343567 A1* | 12/2013 | Triplett | G06F 16/68 | 381/77 |
| 2013/0347022 A1* | 12/2013 | Bates | H04N 21/4825 | 725/25 |
| 2014/0005813 A1* | 1/2014 | Reimann | G06F 3/16 | 700/94 |

* cited by examiner

INTELLIGENT MEDIA QUEUE

CROSS REFERENCE TO RELATED APPLICATIONS

This application is a Continuation of U.S. application Ser. No. 15/182,902, filed on Jun. 15, 2016, entitled "Intelligent Media Queue," which is a Continuation of U.S. application Ser. No. 13/609,169, filed on Sep. 10, 2012, entitled "Intelligent Media Queue," both of which are expressly incorporated by reference herein in their entireties.

BACKGROUND

1. Technical Field

The present disclosure relates generally to playing digital media content and, more specifically, to techniques and systems for creating a dynamic playlist for managing the playback of digital media content.

2. Introduction

In recent years, electronic devices capable of playing digital music have become commonplace. For instance, electronic devices such as laptop computers, handheld digital media players, smart phones, and handheld gaming systems are used daily by society to listen to music. As a result of the growing popularity of these electronic devices, the sale of digital music has grown dramatically. Users can utilize various avenues to access digital music, including visiting an online store to purchase digital music as a single track or a complete album. Users can also share their music with one another or stream music online.

As the amount of digital media available to a user increases, improved techniques must be applied to organize and manage this information. Traditionally, playlists have been used to organize the music into collections, and, through a selection of a song or through a selection of a playlist from such collections, the music can be played. The playlists would be stored persistently and be selectable by the consumer when he or she wishes to play the songs associated with the playlist. However, these traditional techniques are very limiting in that they require the overhead of creating a playlist and storing it. Moreover, the traditional playlist environment is not well suited for dynamic changes to a consumer's desires. For example, assume that a student is playing music from a playlist in his dorm room. His friend comes into his room and wants to listen to a song that is not in the currently playing playlist. Traditionally, selecting the one song to play would terminate playback of the playlist or the song would be added into the persistent playlist, thus becoming a part of the playlist. Both of these behaviors are undesirable to the student, who would like to continue listening to his playlist after his friend listens to the song, and would not desire to have the friend's selection added to his playlist.

While there have been many advancements in the use and distribution of digital media, there is still a need for improved techniques for managing playback of digital media.

SUMMARY

Additional features and advantages of the disclosure will be set forth in the description which follows, and will become apparent from the description, or can be learned by practice of the herein disclosed principles by those skilled in the art. The features and advantages of the disclosure can be realized and obtained by means of the disclosed instrumentalities and combinations as set forth in detail herein. These and other features of the disclosure will become more fully apparent from the following description, or can be learned by the practice of the principles set forth herein.

Disclosed are systems, methods, and non-transitory computer-readable storage media for intelligently managing the playback of digital media. The digital media can include audio songs, videos, movies, images, photos, and other digital media content. An intelligent dynamic queue is configured to manage the playback of digital media. A user can submit requests to playback digital media (from a single source or various sources) by adding the digital media to the queue. Depending on the digital media added and the process used to add the digital media, the digital media can take on different properties. The media playback application can manage the handling of the digital media in the queue by utilizing a queue status field that is associated with each digital media item in the queue. In some examples, the queue can contain multiple entries that specify the playback sequence. Each entry can be associated with a digital media item and can also include a queue status field. The queue status field stores a variable describing whether the digital media item associated with the entry is manually queued (i.e., the digital media item was explicitly added to the queue) or automatically queued (i.e., the digital media item was implicitly added to the queue via a predetermined collection, such as a playlist).

In one embodiment, some entries in the queue can be purged (e.g., deleted) when a triggering event occurs. Exemplary triggering events include changing the media source or adding a collection of digital media to the queue. For example, the media playback application can be configured to purge the queue when the media source changes, when an album is added to the queue, when a playlist is added to the queue, and/or other scenarios. The determination of which entries to purge can depend on the queue status field of each entry. In one example, entries in the queue that have a queue status field set to manual entry remain in the queue because the user explicitly requested the digital media item. In contrast, entries that have a queue status field set to automatic entry are deleted from the queue because they were automatically added into the queue. In some embodiments, the queue status field of a digital media item in the queue can be updated as other digital media items enter the queue.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof, which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
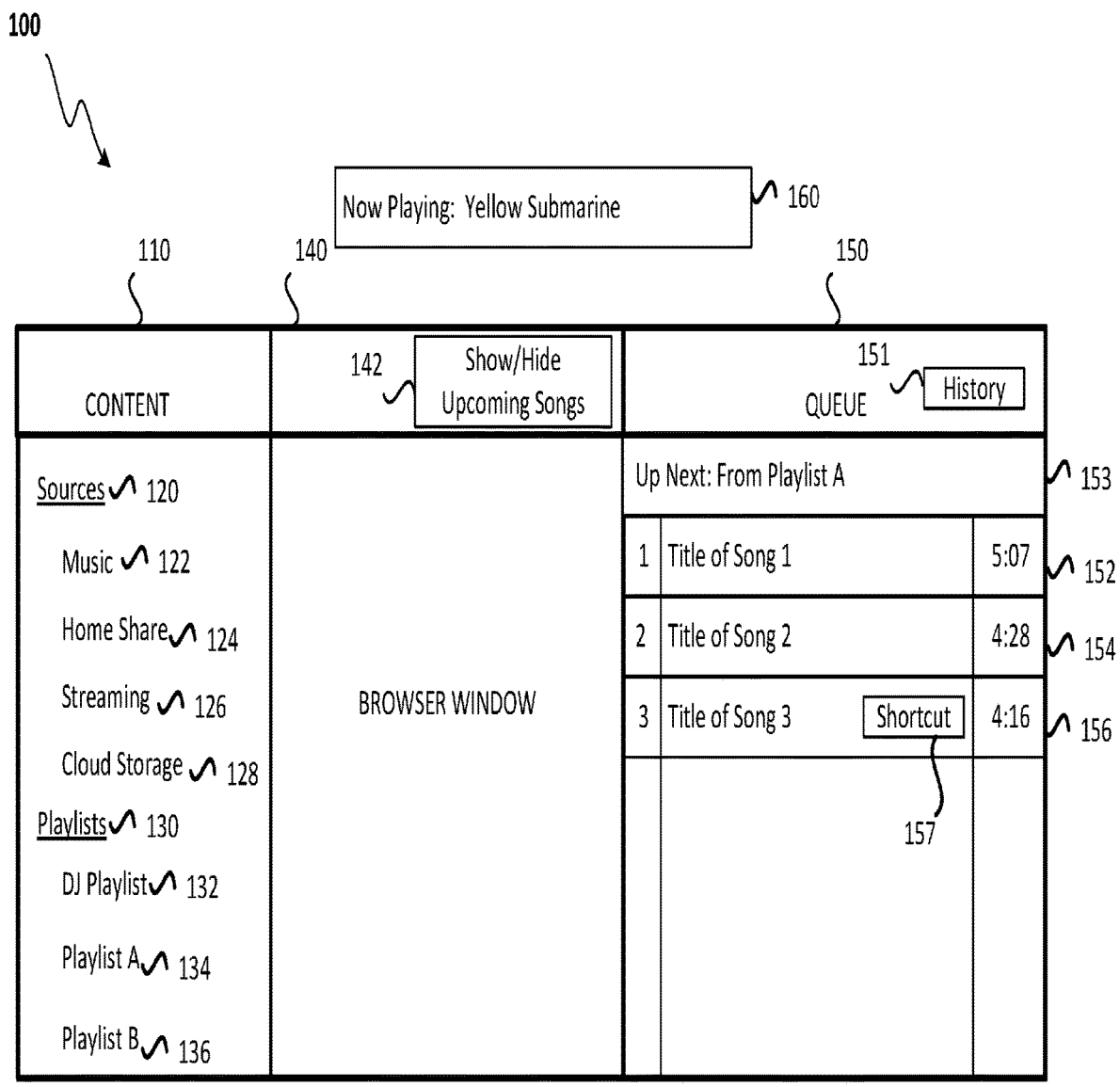
FIG. 1 illustrates an exemplary media playback application.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for systems, techniques, and methods for improved playback management of digital media. The digital media can include digital songs, movies, videos, podcasts, music videos, images, photos, and other digital media content. While the disclosure focuses on playback management for digital songs, it is to be understood by a person of ordinary skill in the relevant art that these teachings also apply to playback management for other forms of digital media such as movies, images, videos, photos, podcasts, etc.

The present disclosure focuses on an intelligent queue that is used by a media playback application to manage the playback of digital media items. An intelligent queue is different than a traditional playlist. An intelligent queue can contain media items from multiple media sources, some of the sources being remotely located. If one of the remote sources were to go offline, the integrity of the queue is not affected since the intelligent queue is configured to skip songs that are offline. In contrast, a traditional playlist generally contains only items that are locally stored on a playback device. Playlists can sometimes play back media from multiple sources however, when one of the sources go offline, the playlist's integrity is lost. Moreover, an intelligent queue can be dynamically modified by adding other media items into the queue in real time whereas modifications to a playlist are persistent in that they are stored in memory. Furthermore, the intelligent queue is capable of interpreting the user's intentions based on where the user adds digital media into the queue and as a result, affect how other media items in the intelligent queue are handled.

In some examples, different types of digital media can co-exist in a single queue. For example, a queue can include a song and a video that are presented in a specified playback order. A user can submit requests to a media playback application to add songs (or other types of digital media) from a single source or from various sources to the queue. Each song can be linked or otherwise associated with an entry in the queue. Besides adding an individual digital media item, entire playlists, albums, and other collections of music can be selected for addition to the queue. When the collection of music is added, the digital media within the collection are added to the queue. Playback of music by the media playback application can be based on the queue and more specifically, the order that the songs appear in the queue. Since the user can in real time add digital media to the queue, the queue is dynamic and changes constantly based on the user's desires. In some embodiments, the queue is also persistent in that un-played tracks that are in the queue when the media playback application closes will remain queued for playback the next time the media playback application opens.

Through the intelligent queue, the media playback application is capable of seamlessly changing in between two different modes of operation. In a first mode, the media playback application operates in a normal playback mode. In the normal playback mode, the media playback application begins by playing the first song in the playlist and continues to sequentially play through the tracks in the playlist until the last song is played. In a temporary playback mode, songs can be dynamically entered and played back in a specified order. When the list is done, playback is completed and the list is cleared. Traditionally these different modes of operation have been mutually exclusive however through the use of the intelligent queue, the media playback application is able to seamlessly switch between the two modes according to actions items and triggering events initiated by the user. For example, dragging a song into the queue can result in the media playback application transitioning from a normal playback mode to the temporary playback mode. Once the song has completed, the media playback application can transition back to the normal playback mode. Therefore, the media playback application is capable of operating in a normal playback mode that does not require user interaction and then subsequently change to a temporary playback mode when a request is received to listen to a song. Listening to the song does not abandon the normal playback mode. Instead, the media playback application returns to the normal playback mode when the song has completed.

The media playback application can associate queue status fields to a song when the song is added to the queue. More specifically, each entry in the queue can store information related to a song. For example, the information can include a link to the song and a queue status field of the song. Depending on the queue status field associated with the song, the song can be handled differently by the media playback application. In one embodiment, each entry can include a queue status field configured to identify whether a song was manually entered or automatically entered. Manually entered songs can remain in the queue when the source of music changes. As another example, songs that were automatically entered into the queue can be purged from the queue when the source of music changes. The media playback application interprets manually entered songs as songs that the user has explicitly selected to listen to, either now or in the future. In contrast, songs that are automatically entered (e.g., queuing songs from an internet radio station such as Pandora® or queuing songs from a playlist) generally belong to a collection of songs that share a commonality, the commonality being that the songs all belong to a collection that was selected by the user to be added to the queue. Since this commonality is the reason that the songs were added to the queue (and not because the user has manually selected each song to be added into the queue), these songs are volatile and in some instances can be deleted from the queue when the source changes or when the media playback application closes. Examples of songs that are automatically entered into the queue include the situation where a user selects a playlist to be added to the queue or where the user requests the media playback application for ten songs that are similar to a selected seed song. The recommended songs are added to the queue. In some examples, the media playback application can include rules for editing the behavior of the media playback application, such as setting the circumstances when the type (manually entered or automatically entered) should be changed in an entry. Additional details about automatically entered and manually entered songs are discussed below.

Media Playback Application

FIG. 1 illustrates an exemplary media playback application. The media playback application can be an application running on a client device that is capable of playing back digital media. Exemplary media playback applications include the iTunes® media player. Media playback application 100 includes content bar 110, browser window 140, queue bar 150, and currently playing bar 160. Content bar 110 is configured to display music that is available to the user. Using browsing window 140, a user can browse the music from a source and select one or more songs that the user would like to listen to. Selected songs can appear in queue bar 150 for scheduled playback. Queue bar 150 can be hidden or displayed using show/hide upcoming songs button 142. In some examples, queue bar 150 can be a pop up screen rather than a side bar, where the pop up screen can be activated or deactivated through a display option such as show/hide upcoming songs button 142.

In one embodiment, content bar 110 can be organized into sources 120 and playlists 130. Sources 120 display a list of sources of music that are available to the user. Here, the sources include local music library 122 (e.g., music library that the user has stored locally on his device), home share 124 (e.g., music from the music libraries of other users on the same network), streaming 126 (e.g., music that the user streams from remote sources, such as internet radio stations), and cloud storage 128 (e.g., music stored remotely that the user has rights to play or is otherwise associated with the user). Available music that is not stored on the user's local device can be accessed through Wifi, Bluetooth, Intranet, Internet, and other connection options. In other embodiments, other types of media can exist in the sources, such as movies and TV shows. However for simplicity, only audio tracks are discussed. A person of ordinary skill in the art would be able to expand the teachings here to other types of media, such as movies, images, podcasts, videos, photos, etc.

Playlists 130 shows a list of playlists that are available to the user. The playlists can be generated by the user or automatically generated by a third-party service, a remote server, or the media playback application. Here, playlists 130 include DJ playlist 132, playlist A 134 and playlist B 136. Playlist A 134 and playlist B 136 may include a collection of songs that are available to the user from sources 120. DJ playlist 132 can include a collection of songs that was automatically generated by the media playback application or a remote server. In one embodiment, the media playback application automatically creates the collection of music based on parameters provided by the user. For example, top rated songs can be added and prioritized by placing them in a higher queue position than other songs. In some examples, DJ playlist 132 can be dynamically generated whenever the playlist is selected. This can allow DJ playlist 132 to take advantage of up to date metadata when automatically selecting the songs to play. In other examples, DJ playlist 132 can be generated or regenerated based on user request.

Queue 150 displays an ordered list of songs for playback. The songs in the list can be from multiple sources or multiple playlists. The order that the songs appear in queue 150 is the playback sequence of the queue. When a currently playing song is finished or about to be finished playing on a media player device, the next song in the queue is retrieved for playback. For media stored remotely (i.e., not stored on the user's device), the media playback application can pre-fetch a predetermined number of songs in the queue from the remote source and store them locally for future playback. This may improve performance by reducing the opportunity for the music to refresh or lag during playback. The retrieved song is removed from the ordered list and the remaining songs in the list are promoted up one cell. Since songs can be dynamically selected and added into the queue, queue 150 also is dynamic in nature. Thus, a user can add songs into the queue. In other examples, other people using other devices can add songs to the queue. Queue 150 can also be persistent, thus allowing songs that were scheduled for playback to be presented to the user the next time the user starts the media playback application.

Here, queue 150 includes entries 152, 154, and 156, each identifying a song from a particular media source. The three songs 152, 154, and 156 are located under heading 153 titled "Up Next." The songs are presented in a specified playback order. Thus, the next song to be played is the song identified by entry 152, followed by the song identified by entry 154, followed by the song identified by entry 156. In some examples, heading 153 can also present other information associated with the origin of this grouping of songs. For example if the songs are all part of a playlist, the name of the playlist can also be presented in heading 153. This can be useful to provide additional information about the collection of music that the user is currently listening to. In some examples, each entry 152, 154, 156 can display additional information about the song in an auxiliary view that is displayed when a cursor is placed over the song. For example, queue 150 may by default be configured to display the title of the song and the duration of the song. However when the cursor is placed over the entry, song metadata such as lyrics, artist, genre, rating, etc. can also be displayed in an auxiliary view. In other examples, hidden action items that can be performed on the entry can also be presented when the cursor is placed over the song or the cursor rolls over the song/entry. For example, action items such as skip song, promote song to play next, promote song to play immediately, rate song, create a playlist by using the song as a root song, and others can be presented to the user when the cursor is placed over the song/entry. In other examples, one or more of these action items can be fixed on the entry and presented along with the default information displayed. Here, entry 156 presents shortcut 157 along with the title and duration (i.e., default information). Shortcut 157 can be linked to a predefined or user defined action item associated with the song such as skip song or move song to play next. In some examples, shortcut 157 can appear on a rollover.

Queue 150 can also include a history icon 151. History icon 151, when selected, presents a list of songs that have been previously played by the media playback application. The list of previously played songs can include songs from different sources and playlists. In one embodiment, a predefined minimum play time can be applied to songs that are partially played to determine whether the song should be added into the history. For example, a user who is sampling songs from his music library (i.e., quickly listening to a few seconds of a song for purposes of evaluating a song or selecting songs to be added to a playlist or other container) may not want the sampled songs to be included into the history since doing so may clutter the history. As another example, a user who listens to the first few seconds of a song may decide to skip it and not wish for the song to be displayed in the history. This can be prevented by setting minimum play time parameters that are to be met before a song is added into history. For instance, a minimum play time parameter may state that a song must be played for 10 seconds before it is added into the history. In some examples, the list of upcoming songs shown in queue 150 can be replaced with the list of items that have been previously played when history 151 is selected. In other examples, the information presented for each song in history can vary depending on the source or playlist. For example, radio sources can present the name of the radio station and optionally the name of the song. As another example, a playlist can be associated with a color scheme, icon, or other identifier. In the history, songs from that playlist can be presented with the identifier. Media playback application can also include window 160 configured to display the currently playing song. As songs finish and the next song is fetched from the queue, the song presented in window 160 can change. In some examples, queue 150 can be configured to also display the currently playing song in a entry above banner 153.

Queue 150 can be presented as a window of a given size. The size of the window can be fixed or dynamic. In one embodiment, the size of the window can dynamically change based on the size of the GUI of the media playback application or other windows of the media playback application. For example, as the media playback application is resized by the user, queue 150 can also be resized. The number of entries presented in queue 150 can also vary depending on the size of queue 150. If there are more items in the queue (or history) that can be presented in the number of entries available, different UI techniques such as a "show more" option to see additional pages of items or scroll functionality can be implemented to view or access those additional items.

Intelligent Media Queue

Figure 2A:
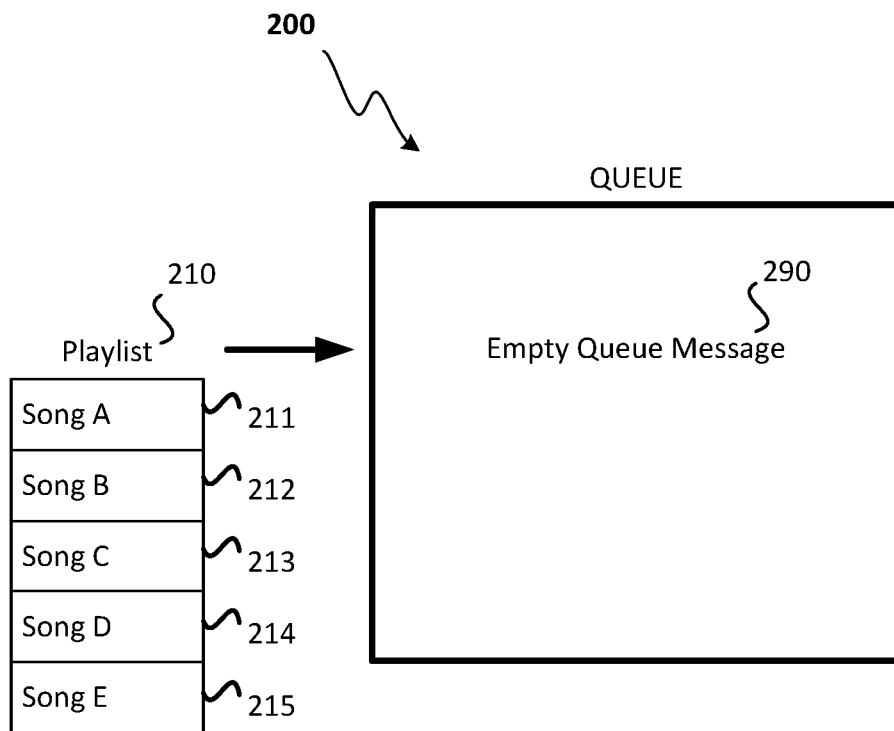
FIGS. 2a and 2b illustrate an exemplary queue.
Figure 2B:
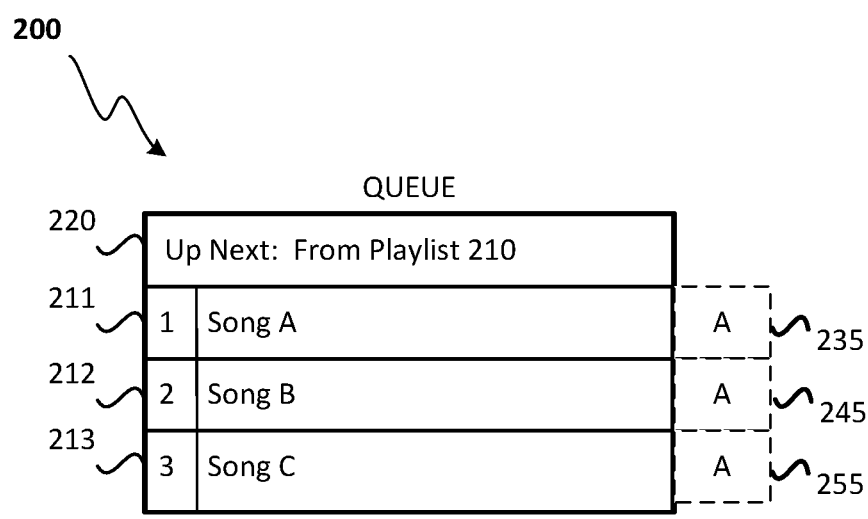

FIGS. 2a and 2b illustrate an exemplary queue. The exemplary queue can be presented on a graphical user interface. As described above, a queue is a data structure configured to manage an ordered list of media items for playback, where the media items may be located or stored at different sources. The order that the media items appear in the queue can represent the playback sequence of the media items. The queue may have functionality and properties that are user-configurable to assist in improving the user's experience while listening to music. For instance, action items or metadata associated with a song can be configured to be displayed on the respective entry of that song. As shown in FIG. 2a, empty queue message 290 can be presented when queue 200 is empty. Empty queue message 290 can be configured to provide instructions on how to use the queue. For example, empty queue message 290 can include a message "When music is playing, this area shows upcoming songs. You can add, remove, or rearrange songs as you go." Empty queue message 290 can also provide instructions on how to add a playlist or other collection of music to the queue.

As shown in FIG. 2a, playlist 210 has been selected by a user to be added to queue 200. Playlist 200 is a collection of music containing songs 211 to 215. Each song can include metadata describing the song such as song title, artist, album, composer, genre, rating, year, and others. In one example, playlist 200 can be a manual type playlist like a mixed tape or a playlist that is manually populated by the user. In another example, playlist 200 can be a smart type playlist that is automatically populated based on search criteria such as genre, year, artist, ranking, or other attribute or theme. In some cases, there may be underlying logic to the combination of music while in other cases, there may be no logic to the creation of the playlist. As such, it is difficult for the media playback application to determine whether the user is selecting the playlist because the user wishes to listen to all tracks in the playlist or alternatively wishes to just listen to a playlist in a similar fashion as a person listening to a radio station (where it is the dominant theme or genre of the playlist rather than the individual tracks that the user wishes to listen to).

In some examples, the media playback application can use heuristics to determine whether the playlist is being added for the specific tracks within the playlist or for the dominant theme of the playlist. Dominant themes can be songs that are highly ranked, songs having the same genre, songs that have the same artist, or songs that have any other common theme, When the playlist is selected for its theme rather than the individual tracks in the playlist, the tracks in the playlist can be purged from the queue when the user wishes to listen to something else (e.g., another playlist, album, or other collection of music.) For example, purging can remove tracks that were automatically entered into the queue. For instance, adding a smart type playlist to the queue results in a plurality of non-user selected being added into the queue. If the user wishes to listen to a single song, a detour can be created in the queue where the song is played followed by continued playback of the playlist. If the user does not switch to something else, the songs in the queue can be played in sequential order.

While a playlist is described here, the heuristics can also be applied to other collections of music, such as albums and smart playlists (e.g., playlists that have been automatically generated based on one or more seed songs). In some examples, user settings can be set to define how the media playback application handles different collections. For example, user settings can define that songs within a particular type of collection should be treated as an automatic entry or a manual entry. As another example, the user settings can define that a type of collection having more than a predefined number of media items should have all items within the collection be treated as automatic entries. A song can have a queue status field that can be set to manual entry or automatic entry. Manual entry is a song that the media playback application interprets as a song that the user has made a conscious decision to manually enter into the queue. A manual entry can be treated differently than an automatic entry (e.g., a song that gets automatically added into the queue based on a user's selection of a collection of music). For example, the user settings or rules can define the media playback application's behavior when a playlist, album, or other collection of music is added to the queue. Default settings can also be set when the user has not defined the user settings. When media is added to the queue, the media can be animated as it enters the queue, thus creating the appearance that the media is being physically added to the queue.

FIG. 2b illustrates queue 200 after playlist 210 has been added. When a playlist or other collection of songs is added to an empty queue, the media playback application enters a passive playback mode. In the passive playback mode, the application populates the queue with songs from the collection of songs when space is available in the queue and continues to play music from the collection of songs until all songs are played. Here, a user setting specifies that when a playlist is added to a queue, songs belonging to the playlist are to be treated as automatic entries. As shown, queue 200 includes banner 220 that reads "Up Next: From Playlist 210." This informs the user that the songs in the list are from playlist 210. The media playback application can sequentially play songs from queue 200 based on the sequence they appear in queue 200. For example, playback will begin with song 211 which resides in the first entry of the queue, followed by song 212 which resides in the second entry of the queue, followed by song 213 which resides in the third entry of the queue. Each song can include a queue status field (235, 245, 255) describing whether the song was manually entered ("M") or automatically entered ("A"). As shown in FIG. 2b, the songs added from playlist 210 are treated as automatic entries based on a user setting. As such, songs 211, 212, and 213 are all marked as an automatic entries (see queue status field 235, 245, and 255, respectively), as shown by the letter "A." In another example where a radio station is added to the playlist, banner 220 can read "Up Next: From Radio Station <name>." Below, each entry can present a short description of the radio station, thus preventing the user from knowing the name of the song before playback.

The media player may pre-fetch a predetermined number of songs from the radio station or other remote source. The predetermined number can be set to a small value to minimize wasted costs from fetched songs that are not played back. The predetermined number can also be set to a large enough value to prevent poor playback performance due to periods of slow downloading speeds or periods of inability to communicate with the remote source. In some examples, the predetermined number can be dynamically updated based on the performance of the remote source and the client device running the media playback application. For example, the media player application can increase the predetermined number when poor playback performance is experienced due to poor wireless service. This can occur when the client device is located in a metropolitan city with many users or in the mountainside where reception is sparse. By increasing the predetermined number of media items that are buffered, the media playback application is capable of not communicating with the remote source for a longer period of time and therefore lowering the likelihood that the buffer will be depleted before the client device is able to communicate with the remote source. As another example, the predetermined number can be decreased when the media playback application determines that the number of songs that are fetched but not played back is greater than a given threshold. In some examples, the predetermined number can be temporarily increased (or decreased) and subsequently returned to its original value.

In some examples where the collection being added to queue 200 contains more media items than the number of entries in queue 200, the media playback application can automatically populate entries in the queue with songs from the collection when the entries become available. For example, queue 200 can be populated with songs 211-213 of playlist 210 when playlist 210 is added into queue 200. When song 211 transitions to being currently played, songs 212 and 213 are promoted up an entry, thus leaving the last entry empty. As a result, song 214 is added to queue 200 to fill the available entry. In other examples, additional pages or a scrolling functionality can be implemented to view songs 214 and 215.

In some examples, the music player application may analyze a request to add a collection of songs before the collection of songs is added into the queue. Various rules can be applied during the analysis. For example, the media playback application may analyze the number of songs in a playlist before adding the songs to the queue. If the number of songs is greater than a predefined limit, a prompt can be presented to the user to confirm whether the user intended to add the songs to the queue. As another example, the type of the container can be used in the analysis. For instance, a prompt can be presented when adding a playlist but not presented when adding an individual song or album.

Figure 3A:
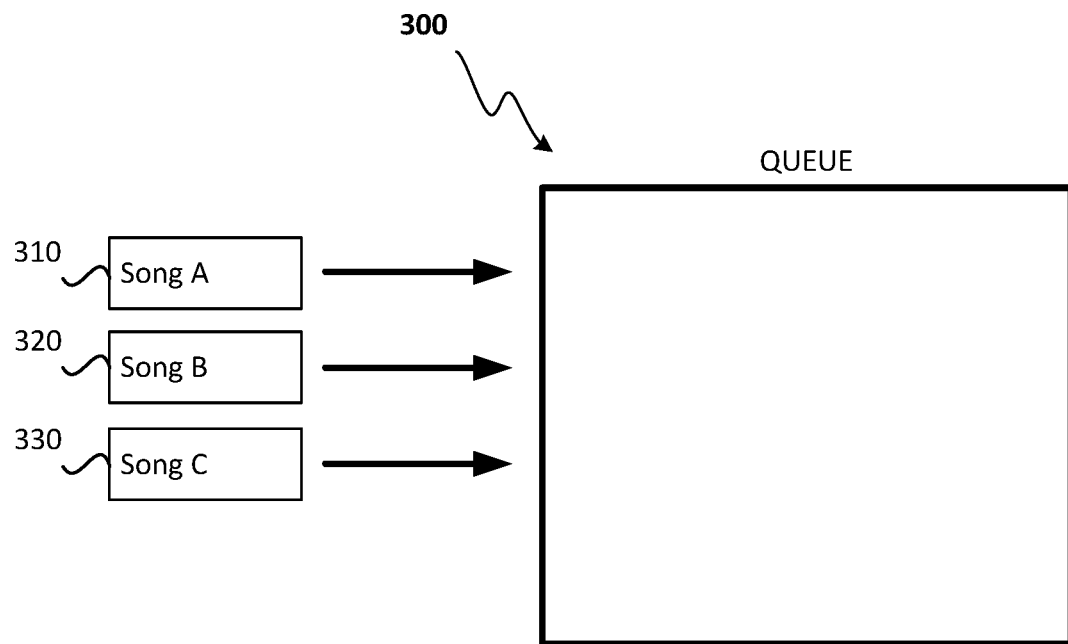
FIGS. 3a and 3b illustrate another exemplary queue.
Figure 3B:
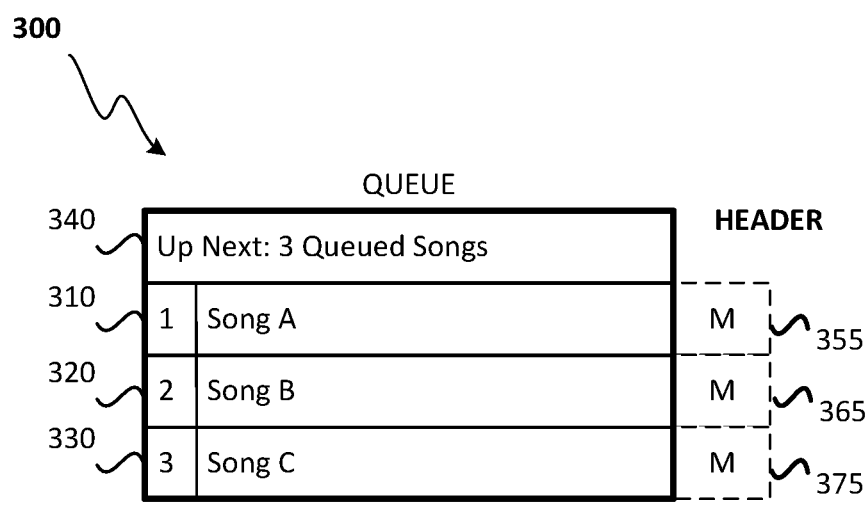

FIGS. 3a and 3b illustrate another exemplary queue. The exemplary queue can be presented on a graphical user interface. Queue 300 can be similar or substantially similar to queue 200 of FIGS. 2a and 2b. As shown in FIG. 3a, instructions have been received to add three songs (songs 310, 320 and 330, in that order) to queue 300. Each song has been manually selected for queue 300. The resulting queue after adding in the songs is shown in FIG. 3b. As shown, the songs appear in the queue in the order that they were selected. More specifically song 310 is listed as the first song, song 320 is listed as the second song, and song 330 is listed as the third. Each entry also has a queue status field specifying that all three songs are manually entries "M" (queue status field 355, 365, and 375, respectively). When songs are manually selected and added to an empty queue, the media playback application enters an active playback mode. In one example, all entries into the queue are treated as manual entries when in active playback mode. Thus, in addition to individual songs, a collection of songs entered into the queue are also treated as manual entries. In another example, automatic entries can also enter into the queue when in active playback mode. For example, selection of a playlist to add to the queue without specifying the location to add the playlist to the queue can result in the playlist being appended to the end of the queue and the tracks within the playlist being treated as automatic entries. In contrast if the location to add the playlist into the queue is specified, the tracks within the playlist can be treated as automatic entries. Thus, the manner in which songs are entered into the queue can affect the attributes associated with the song and in turn the manner in which the media playback application handles these songs. Songs that enter the queue via a collection may be added as automatic entries when in a passive playback mode but as manual entries when in an active playback mode. Thus, the user setting and the playback mode can affect the queue status field associated with the songs added.

Banner 340 of queue 300 provides a synopsis of the upcoming tracks in the queue. Here, banner 340 is configured to display the number of manually entered songs in the queue that are coming up. In contrast when the upcoming songs are automatically entered songs (or when the media playback application is in a passive playback mode), banner 340 is configured to display the title of the collection that the songs belong to (e.g., playlist title, album title, radio station title, etc.). Thus, the information presented on the banner of queue can vary depending on the songs in the queue and/or the playback mode.

Queue Actions

Figure 4A:
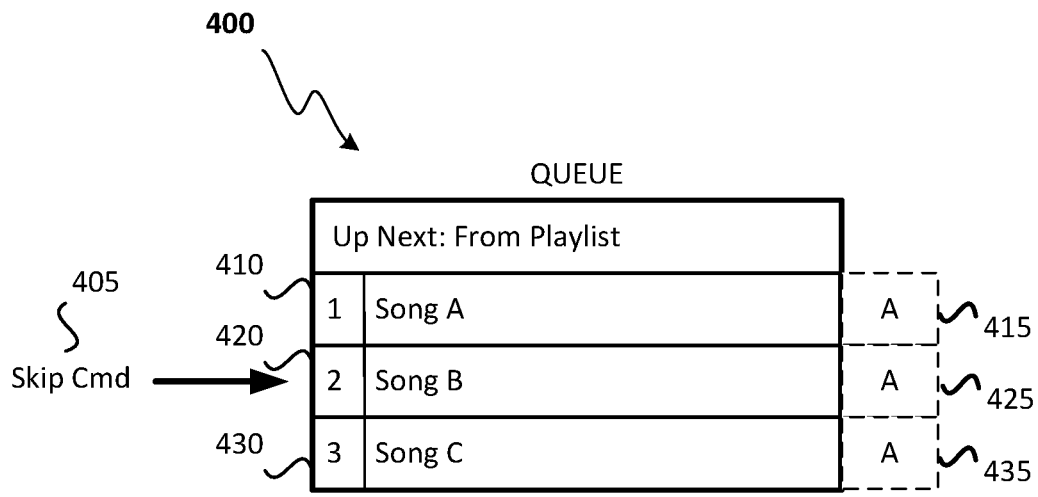
FIGS. 4a and 4b illustrate an example of skipping a song in a queue.
Figure 4B:
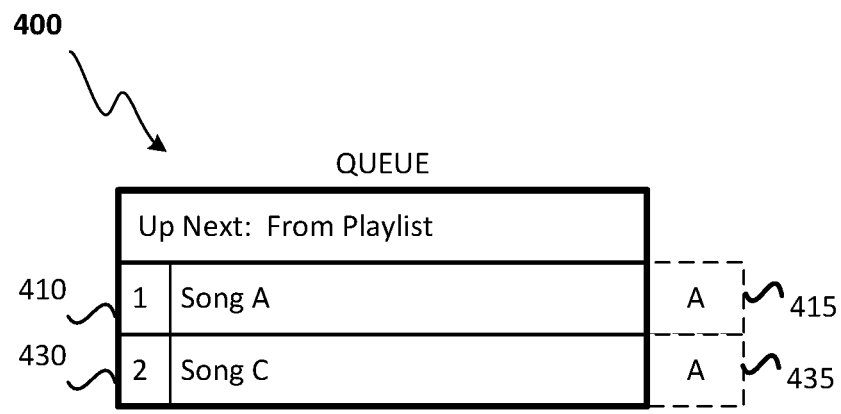

FIGS. 4a and 4b illustrate an example of skipping a song in a queue. The exemplary queue can be presented on a graphical user interface. A user can trigger the skip command by rolling over an entry or by selecting a skip option associated with the entry. Queue 400 can be similar or substantially similar as queue 300 of FIGS. 3*a* and 3*b* and queue 200 of FIGS. 2*a* and 2*b*. As shown in FIG. 4*a*, there are currently songs 410, 420, and 430 of queue 400. As illustrated by queue status fields 415, 425, and 435, each of these songs were automatically entered into queue 400 ("A"). Command 405 is received to skip song 420. FIG. 4*b* illustrates queue 400 after the entry associated with song 420 has been removed. As shown, the entry for song 430 has been promoted in queue 400 and now is next to song 410. In some examples, a skipped song may not be added to the queue history unless user settings specify otherwise. As shown, skipping a song does not affect the attributes of the songs stored in other entries.

In some examples, skipping a song can alter the queue status field of other entries in the queue. For example, the media playback application can interpret the action of skipping a song in the queue as meaning that the user wishes to listen to the songs not skipped. If the user did not want to listen to the other songs in the queue, the user could have skipped those songs also. As a result, songs that remain in the queue after a skip command can be converted to being manually entered. In one example, only entries in the queue above the skipped song are converted to being manually entered since it is possible that the user is glancing over the list from the top down. As such, only the queue status fields of songs above the currently skipped song are candidate to be altered. Entries that have a queue status field of manually entered can be preserved in the queue when the queue is purged.

Figure 5A:
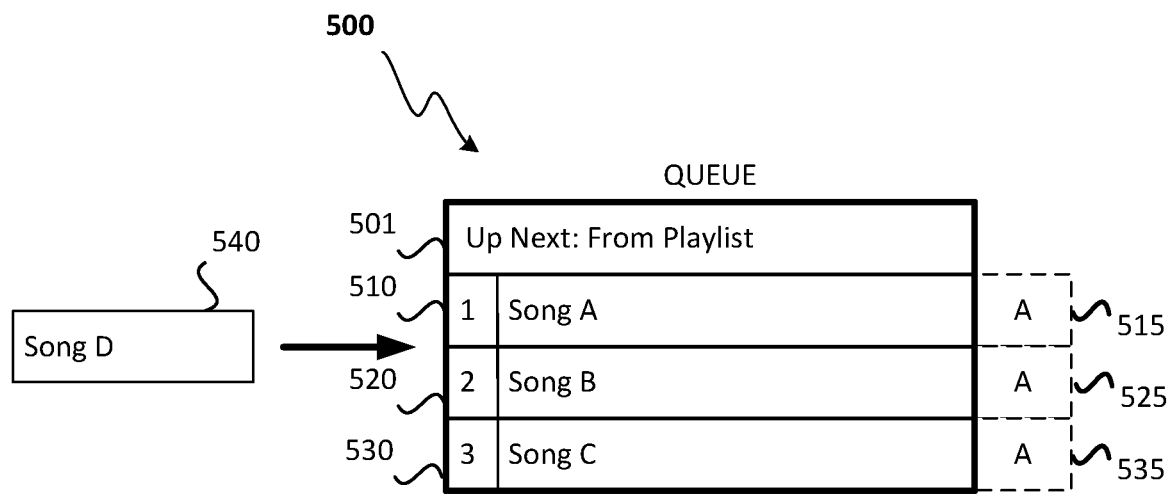
FIGS. 5a and 5b illustrate an example of adding a song to a queue.
Figure 5B:
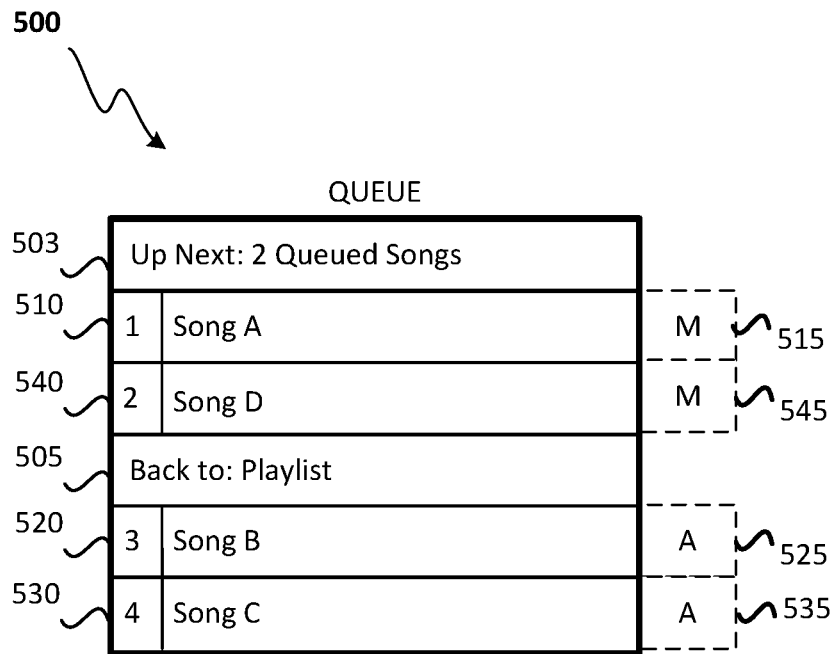

FIGS. 5*a* and 5*b* illustrate an example of adding a song to a queue. The exemplary queue can be presented on a graphical user interface. The song can be added into the queue through various trigger mechanisms, such as the selection of an action item associated with the song or dragging and dropping the song into the queue. In one embodiment, the song can be added at a specific location (e.g., entry) in the queue according to the user command received. For example, an action item associated with the song can be triggered by a user command which causes the song to be added as the next song to be played in the queue, to play now (e.g., cancel current song and play this song), or to add to the end or any other location in the queue.

In one embodiment, the media playback application can include a rule configured to treat all songs that appear before the newly added song as songs that should be played in the queue. The user has deliberately added the song after these songs and thus, it can be presumed that the user would like to hear all the songs placed before the location of the added song. Thus, the media playback application can convert an attribute of songs in front of the added song that were originally set as an automatic entry into a manual entry.

Here, queue 500 can be similar or substantially similar to queue 400 of FIGS. 4*a* and 4*b*, queue 300 of FIGS. 3*a* and 3*b*, and queue 200 of FIGS. 2*a* and 2*b*. As shown in FIG. 5*a*, queue 500 includes songs 510, 520, and 530 and each song was automatically added into queue 500 (attributes 515, 525, and 535 set as "A" for automatic entries). Banner 505 is presented to inform the user that a playlist including songs 510, 520, and 530 is currently playing, with each of songs 510, 520, and 530 being an automatic entry. The name of the playlist can be displayed here as part of Banner 505. A command is received to add song 540 at a location in between songs 510 and 520 of the playlist. For example, song 540 can be dragged from the music library and dropped in between song 510 and song 520 of queue 500. Upon receiving this command, the media playback application can shift songs 520 and 530 downstream, thus making available an entry in queue 500 for song 540. As shown in FIG. 5*b*, song 540 is now associated with an entry that is located in between song 510 and song 520.

When a song is manually added to a queue while the media playback application is in a passive playback mode (i.e., the entries in the queue are automatic entries), the media playback application can enter a mixed playback mode. When the media playback application is in a mixed playback mode, songs that are scheduled to play before the currently added song can have their queue status field set to manual entry, if necessary, to signify that the user has made a conscious decision to play all the songs queued above the currently added song. This ensures that song 540 and all songs in the queue above song 540 (e.g., song 510) are played by the media playback application in the specified order. In other words, songs that are set to manual entry are not purged. After adding in song 540, queue 500 now includes both manual entries and automatic entries. In some embodiments, a queue having multiple types of entries can include separate banners for each type of entry. For example, manual entries can be grouped together and associated with one banner while automatic entries can be grouped together and associated with another banner. Here, banner 503 is configured to describe the manual entries. As shown, banner 503 describes that there are two queued songs to be played next. Similarly, banner 505 is configured to notify the user that after these two manually queued songs, the media playback application will return to the playing music from the playlist. Here, the name of the playlist can be displayed. If the playlist has additional songs not present in the queue, they can be added into the queue as entries in the queue become available. In some examples, all actions to add songs into the queue are treated as manual entries once the user has manually entered songs into the queue. This is because treating entries as automatic entries may destructively clear the manual entries from the queue.

In some embodiments, the shuffle command may take on different functionality based on the type of entries in the queue. For example, if the queue contains both manual entries and automatic entries, a shuffle command performed may only shuffle the automatic entries in the queue. This is because the manual entries were placed in a specific order by the user and thus, should be played back in that order. As another example, the performance of the shuffle command can be based on both the type of entries in the queue and the currently playing song. For example, if the currently playing song is a manual entry, all the manual entries in the queue can be shuffled. Similarly if the currently playing song is an automatic entry, all the automatic entries in the queue can be shuffled. User defined options can be configured to override this default behavior.

While the example illustrated in FIGS. 5*a* and 5*b* show adding in a song to a queue, similar techniques can be applied to add in a playlist, an album, or other collection of songs. The collection of songs would be added to the playlist at the specified location. For example if a playlist containing four songs were added in between the third and fourth entry of the queue, the four songs in the playlist would result in occupying the fourth, fifth, sixth, and seventh entry slots in the queue. The song (or songs) can come from various sources including an internet radio station, home share, streaming, other user's library, cloud storage, and other sources. Depending on the source, different techniques can be used to present song information on the entry. In one embodiment an internet radio station that is added into the queue can display the name of the radio station on an entry instead of displaying the name of a song. The radio station name may be displayed instead of the specific name of the song for various reasons. For example, the song being played by the radio station changes as the radio station entry in the queue moves to the currently playing position. Since it is difficult to determine the song that will be played when the entry of the radio station is promoted to the currently playing position, it is logical to use the name of the radio station on the entry instead of the name of the song. In another example, the radio station may not want the user to know the name of the upcoming song. This can prevent the user from waiting for an upcoming song that the user wishes to acquire and then copying the song as the song is played. A single entry can remain in the queue as songs from the internet radio station continue playing, where that single entry is configured to inform the user of the internet radio station that is currently being played. For example, the entry can state "Up Next: More from the XYZ station." When songs are manually queued, the single entry representing the internet radio station can be pushed downstream under banner 505 to notify the user that after the manually queued songs, playback will return to the radio station. When the source changes or another playlist is selected, the radio station can be removed from the queue.

Besides adding songs into the queue, actions can also be performed to existing songs in the queue. In some embodiments, different actions can be performed on songs in the queue to change the order or properties/attributes of the songs in the queue. Exemplary actions include drag and drop, play next, and play immediately. For example, drag and drop can move the song from the drag location to the drop location. As another example, play next can move the song from its current location to the first entry in the queue. As yet another example, play immediately can be a combination of two actions. The first action is similar to a play next command where the song is promoted to the first entry in the queue. The second action can be skipping the currently playing song. Therefore, the queue and the attributes of the songs within the queue can change depending on the action performed.

In one embodiment, the media playback application can include intelligence that is used when processing a request to place a song (either an existing song in the queue or adding a song from a source) as the next song in the queue. When a user adds a song to a queue, a determination is made as to whether the user intended the song to be added as the next song to be played or if the user intended the song to be added at the end of a logical collection of songs, one of which is currently being played. A logical collection of songs in some instances can be considered a single work. Since the collection of songs is considered a single work, they are treated as belonging to a single container that the user intends to listen to in sequence. Examples of a container of songs include albums and smart playlists (playlists automatically generated, sometimes based on a theme or trait) containing songs that have similar traits (artist, genre, year, ranking, etc.) based on a selected seed song. For example, if the currently playing song is part of an album, the intention of selecting an action item to place a song as the next song in the queue may be for the song to play following the playing of the album. In some examples, a playlist can also be considered a container. In some examples, heuristics can be used to determine when a collection of music is considered a container of music. These heuristics can be based on user settings that have been set to differentiate a container of music form a collection of music. Exemplary user settings can include a limit to the number of songs that can exist in a container, the similarity of metadata between the songs in the container, and other factors. In some examples, the media playback application can apply container rules to determine when a collection of music is a container. These rules can be weighted in making the determination. Exemplary rules can include a weighting factor if the artist is the same in the collection of music, another weighting factor if the album name is the same in the collection of music, another weighting factor if the genre is the same in the collection of music, another weighting factor if the ratings provided to the songs are similar within a predetermined range, and others.

Figure 6A:
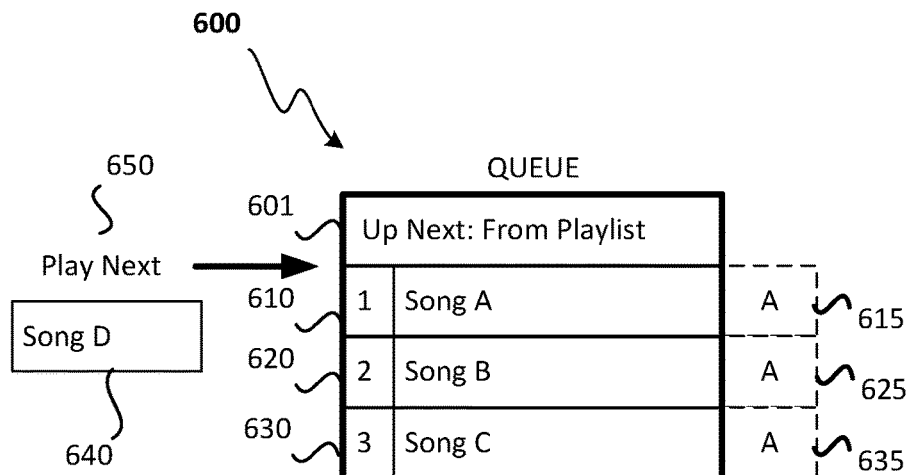
FIGS. 6a, 6b and 6c illustrate an example of adding a song into the queue as the next song to be played.
Figure 6B:
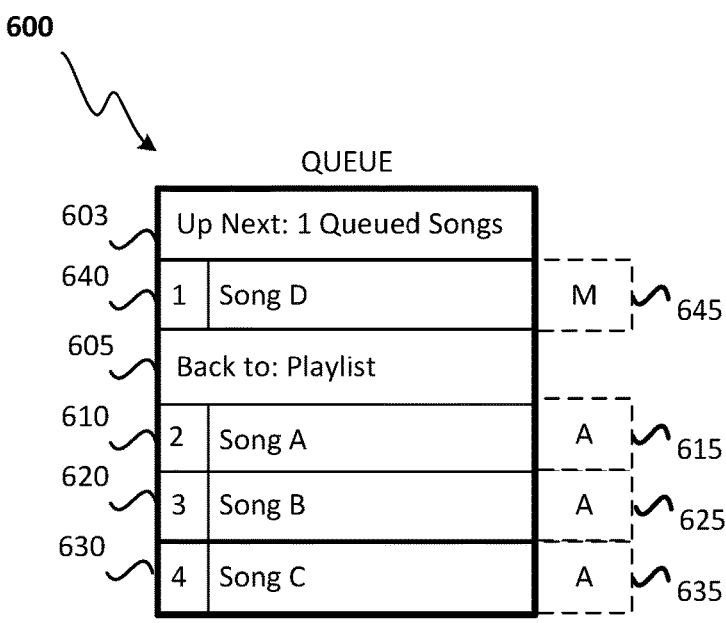
Figure 6C:
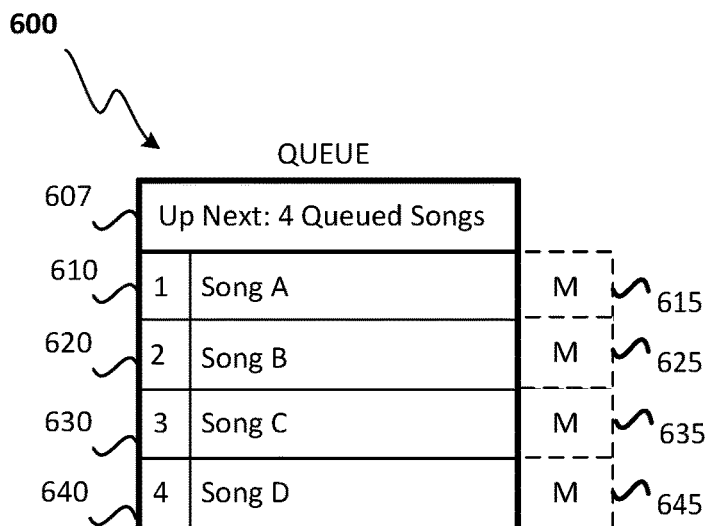

FIGS. 6a, 6b and 6c illustrate an example of adding a song into the queue as the next song to be played. The exemplary queue can be presented on a graphical user interface. Queue 600 can be similar or substantially similar to queue 500 of FIGS. 5a and 5b, queue 400 of FIGS. 4a and 4b, queue 300 of FIGS. 3a and 3b, and queue 200 of FIGS. 2a and 2b. As shown in FIG. 6a, queue 600 includes song 610, song 620, and song 630, in that order and each song is an automatic entry (queue status fields 615, 625, and 635, respectively, set to "A"). Banner 601 is configured to notify the user that the upcoming tracks (e.g., songs) are from playlist. FIG. 6a also illustrates the media playback application receiving instruction or request 650 to play song 640 as the next song in the queue. At this point, the media playback application can make a determination whether one or more of the songs in the queue are part of a container with the currently playing song.

FIG. 6b illustrates an example of queue 600 when the songs in the queue (e.g., songs 610, 620, and 630) are determined to not be part of a container with the currently playing song. As shown, song 640 is added into the queue in the first slot and thus will be the next song played. Since song 640 was manually selected by the user, queue status field 645 of song 640 is set with an queue status field of manually entered. The rest of queue 600 has shifted downstream one position to make room for song 640. As such, songs 610, 620, and 630 have moved down one slot in queue 600. Since the newly added song was not placed behind any existing entries in queue 600, none of the existing queue status fields associated with the songs in the queue (e.g., queue status fields 615, 625, and 635) are altered. As shown in FIG. 6b, queue 600 now has two types of entries in the queue. Banner 603 is configured to provide details about the manually entered songs while banner 605 is configured to provide details about the automatically entered songs. Banner 605 presents information associated with the collection that the rest of the queue belongs to. More specifically, banner 605 presents the name of the playlist added to the queue that results in songs 610, 620, and 630 being added to the queue.

FIG. 6c illustrates another example of queue 600 when the songs in the queue (e.g., songs 610, 620, and 630) are determined to be part of a container with the currently playing song. This is the opposite of the example shown in FIG. 6b. As shown in FIG. 6c, a determination is made that songs 610, 620, and 630 belong to the same container as the currently playing song. The determination can be made by comparing metadata of the currently playing song with metadata of songs 610, 620, and 630. For example, heuristics can be applied by the media playback application to determine whether certain properties of songs 610, 620, and 630 are the same, similar, or related to the properties of the currently playing song. In some instances each property can have a different weighting factor. A similarity value can be generated from comparing the properties of the songs and summing up the weight values. The similarity value can in turn be used to determine whether a song and the currently playing song belong to the same container. Exemplary properties include artist name, album name, genre, year, ranking, track number (checking if the track numbers of the upcoming songs are in sequential order), bit rate, and others. For example, the artist name property can be assigned a weighting factor of 0.8, the album name property can be assigned a weighting factor of 0.8, the genre property can be assigned a weighting factor of 0.7, the year property can be assigned a weighting factor of 0.3, and the bit rate property can be assigned a weighting factor of 0.2. A comparison can be made between the currently playing song and song 610 where the weighting factors assigned to similar properties between the two songs are summed together. If the sum of the weighting factors is greater than 1, the songs are determined to belong in the same container and thus should not be separated in the queue.

Here, the media playback application may, as a result of the heuristics, determine that the currently playing song and songs 610, 620, and 630 belong to the same container and thus are required to be played together before other songs can be played. Since the container has already begun playing the currently playing song, the remainder of the container (song 610, 620, and 630) are played before any other song is played. As a result, the ordered list of songs in queue 600 is song 610, song 620, song 630, and song 640. The media playback application may determine that song 640 is a manual entry because it was manually selected and entered into the queue by the user. As such, queue status field 645 is set to "M" for manual entry. In one example, the media playback application can subsequently determine that there are three songs in front of manually entered song 640. Based on a rule stored on the media playback application, songs in front of a manually entered song can be converted into manual entries. As a result, queue status fields 615, 625, 635, are converted to manual entries.

Figure 7A:
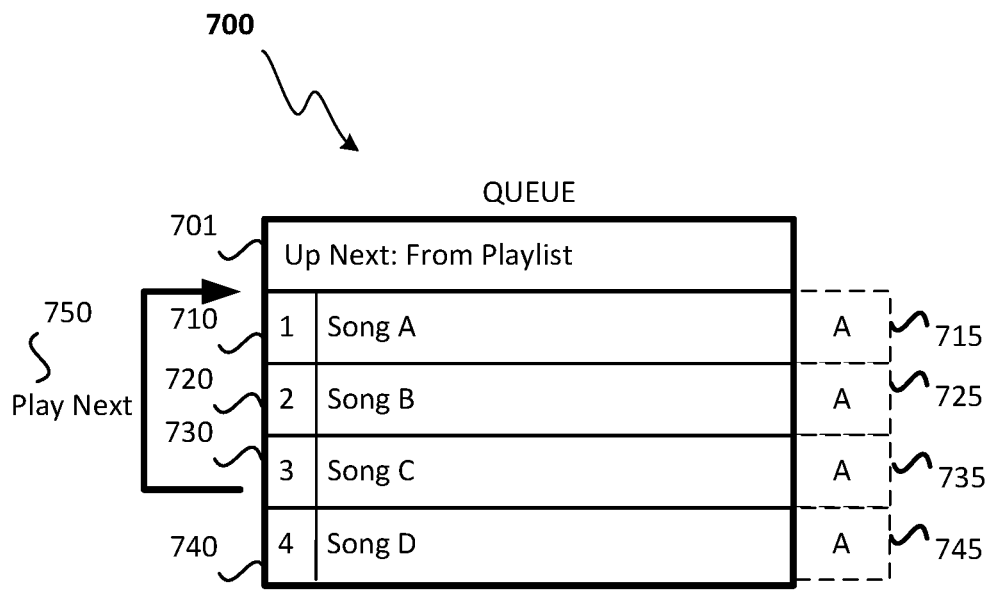
FIGS. 7a and 7b illustrate an example of an action performed on a media item in a queue.
Figure 7B:
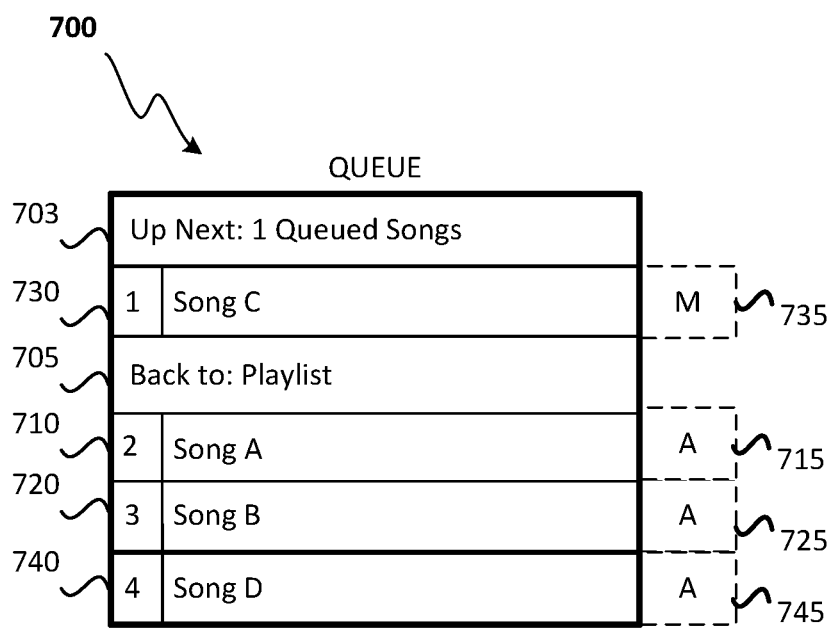

FIGS. 7a and 7b illustrate an example of an action performed on a media item in a queue. The exemplary queue can be presented on a graphical user interface. Queue 700 can be similar or substantially similar to queue 600 of FIGS. 6a, 6b, and 6c, queue 500 of FIGS. 5a and 5b, queue 400 of FIGS. 4a and 4b, queue 300 of FIGS. 3a and 3b, and queue 200 of FIGS. 2a and 2b. As shown in FIG. 7a, queue 700 includes banner 701 notifying the user that the songs scheduled for playback belong to the playlist. The name of the playlist can be displayed in banner 701. Queue 700 includes four songs ordered as song 710, song 720, song 730, and song 740. Each of these songs includes a queue status field identifying them as automatic entries (queue status fields 715, 725, 735, and 745, respectively).

As shown in FIG. 7a, a command of play next action 750 is received and associated with song 730. The media playback application can receive the command along with the desired location in the queue. In response to the command, the media playback application can move the selected song to the first position or spot in the queue. Songs that were originally in front of the selected song can be pushed one slot downstream as the selected song moves up the queue. As shown in FIG. 7b, the media playback application has moved selected song 730 to the first position in the queue and songs 710 and 720 have been pushed downstream one position. The resulting queue order is song 730, song 710, song 720, and song 740. In one embodiment, the media playback application can change one or more queue status fields of the selected song when the selected song is promoted to be played next in the queue. For example, queue status field 735 that is associated with song 730 can be set to manual entry (see queue status field 735 set to "M" in FIG. 7b) to identify the song as a song that was manually entered into the queue. Thus, song attributes can change during manipulation of the queue, thus changing how the media playback application will treat the song. As shown in FIG. 7b, the songs in the queue have been grouped into automatic entries and manual entries. Banners 703 and 705 are configured to present information associated with song 730 and songs 710, 720, and 730, respectively.

Figure 8A:
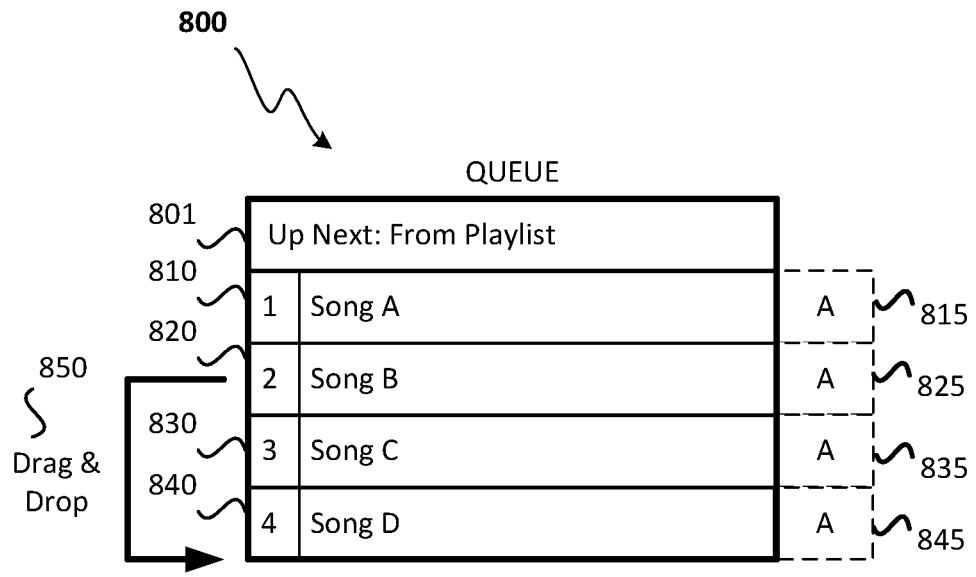
FIGS. 8a and 8b illustrate an example of another action performed in a media item the queue.
Figure 8B:
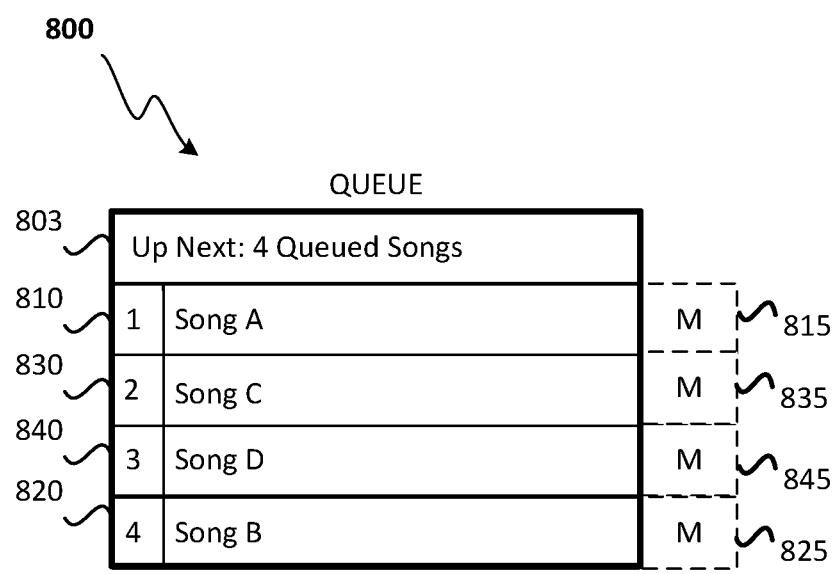

FIGS. 8a and 8b illustrate an example of another action performed in a media item the queue. The exemplary queue can be presented on a graphical user interface. Queue 800 can be similar or substantially similar to queue 700 of FIGS. 7a and 7b, queue 600 of FIGS. 6a, 6b, and 6c, queue 500 of FIGS. 5a and 5b, queue 400 of FIGS. 4a and 4b, queue 300 of FIGS. 3a and 3b, and queue 200 of FIGS. 2a and 2b. As shown in FIG. 8a, queue 800 includes banner 801 and an ordered list of songs including song 810, song 820, song 830, and song 840. A command including drag and drop action 850 is received from the user. Drag and drop action 850 moves a song from a current entry to a new entry. In other words, the drag and drop action moves the song from a first slot in the queue to a second slot in the queue. Here, song 820 is being dragged from the second queue position and dropped after the fourth queue position. FIG. 8b illustrates the resulting queue after drag and drop action 850. As shown, song 820 has been moved behind song 840, thus resulting in queue 800 having the playback order of song 810, song 830, song 840, and song 820. In one embodiment, the media playback application can also change the queue status field of songs that are to be performed before a drop position to manual entry. Since the user has specified a slot to play a particular song, it is presumed that the user also wants to play all songs that appear ahead of the particular song also. As a result, the media playback application can convert queue status fields 815, 835, 845, and 825 to manual entries ("M") since these queue status fields are associated with songs that are played before the selected song (e.g., song 810, song 830, song 845, and song 820, respectively). Since the songs in the playlist have been converted to manual entries, banner 803 is displayed in queue 800. Banner 803 notifies the user that the next four upcoming songs are all queued songs (e.g., manually entered). As discussed below, the media playback application may treat manually entered songs different than automatically entered songs.

In some embodiments, the media playback application can periodically purge (i.e., delete) songs from the queue. Purging entries in the queue can be a housekeeping technique performed by the media playback application to maintain the quality of the queue. In some examples, a song can be purged from the queue based on the how the song entered the queue. For example if the song was a manual entry, it is confident that the user desires to listen to the song. As a result, manual entries are not purged. In contrast if the song was an automatic entry, it is uncertain whether the user desires to listen to this specific song or to the collection that the song belongs to. As a result, automatic entries are purged. Automatically entered entries can have a lower priority over manually entered entries since it is unclear whether the songs were added into the queue because the user selected a collection that contains the song or the user intended to play the song. Songs with higher priority can be played before songs with lower priority. In one example, the automatically entered entries can be considered volatile entries and can be replaced when a triggering event occurs, such as switching the playlist or the source.

In one embodiment, rules can be generated by the media playback application to control the purging behavior of the queue. For example, a rule can be created to purge the queue of automatic entries whenever the source changes. The media playback application can interpret the user's command to change sources as an implicit notification that the user no longer wishes to listen to music from the previous source. As a result, automatic entries which the user did not explicitly add are removed from the queue. In another example, a rule can be created where the queue is purged of automatic entries whenever a collection of media is added to the queue. The collection of media, which can be a playlist or album, can include a plurality of songs. The media playback application can interpret the addition of this collection of media to the queue as meaning that the user is done listening to a previously selected collection of music. As a result, the media playback application can purge the automatic entries from the queue.

Figure 9A:
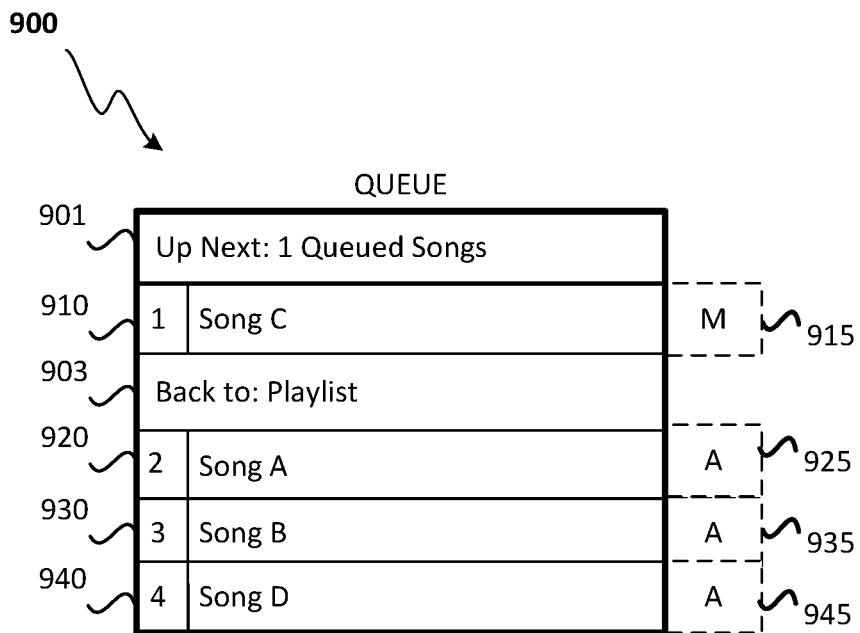
FIGS. 9a and 9b illustrate an example of purging media items from a queue.
Figure 9B:
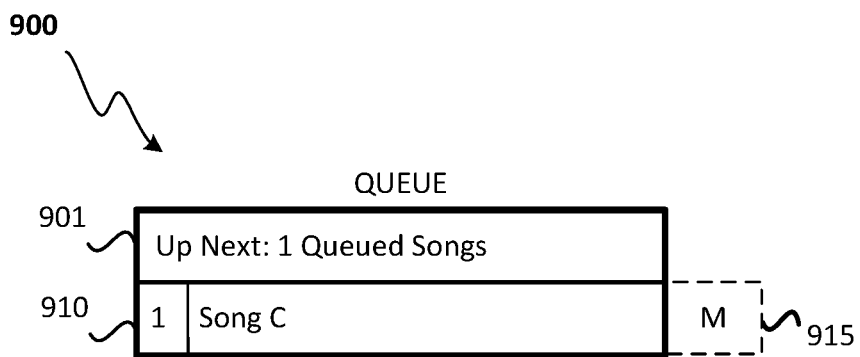

FIGS. 9a and 9b illustrate an example of purging media items from a queue. The exemplary queue can be presented on a graphical user interface. Queue 900 can be similar or substantially similar to queue 800 of FIGS. 8a and 8b, queue 700 of FIGS. 7a and 7b, queue 600 of FIGS. 6a, 6b, and 6c, queue 500 of FIGS. 5a and 5b, queue 400 of FIGS. 4a and 4b, queue 300 of FIGS. 3a and 3b, and queue 200 of FIGS. 2a and 2b. As shown in FIG. 9a, queue 900 includes four songs: song 910 that is queued next for playback and songs 920, 930, and 940 that belong to the playlist. Queue status field 925, 935, and 945 of songs 920, 930, and 940, respectively, inform the media playback application that the songs were automatically entered into the queue ("A"). Similarly, queue status field 915 informs the media playback application that the song 910 was manually entered into the queue. When a triggering event occurs that causes the media playback application to purge the queue, songs containing a queue status field of being automatically entered are deleted from the queue. Exemplary triggering events include changing the media source or adding a collection of digital media to the queue. For example, the media playback application can be configured to purge the queue when the media source changes to an internet radio station, when the media source changes to a remote source, when an album is added to the queue, when a playlist is added to the queue, and/or other scenarios. As shown in FIG. 9b, songs 920, 930, and 940 have been deleted from the queue. Song 910 remains since queue status field 915 states that the song was manually entered. In some examples, the currently playing song can also be skipped as the user transitions to a different media source or collection of music. Some triggering events can result in new songs being added into the queue. Depending on specified location (if any) of the songs entering the queue, song 910 can be played next or played later in the queue.

In some embodiments, the queue can also be configured to present a history list containing songs that have been previously played by the media playback application. The history list can be configured to present a list of songs previously played from newest to oldest. A user can review the previously played songs and decide to purchase or re-queue certain songs for playback. Songs that were skipped or purged during playback are not added into the history list. In some examples, a predefined limit of time can be used by the media playback application to determine whether a song should be added to the history list. For example, a song that is played for less than 10 seconds is not added to the history list. Songs may be played for less than 10 seconds because the user was sampling music and song was skipped during playback or the song is no longer available. A song can be no longer available if the source of the song is no longer online. In some examples, the media playback application may try to find other sources that contain the song, such as the user's media library. If the song cannot be found in the available sources, then the song is skipped from the queue.

Figure 10A:
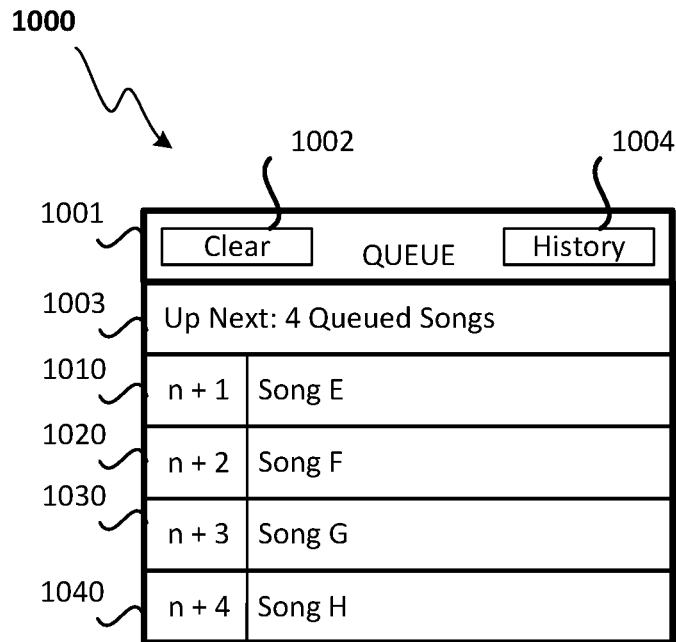
FIGS. 10a and 10b illustrate an example of a queue with a history list. The exemplary queue can be presented on a graphical user interface.
Figure 10B:
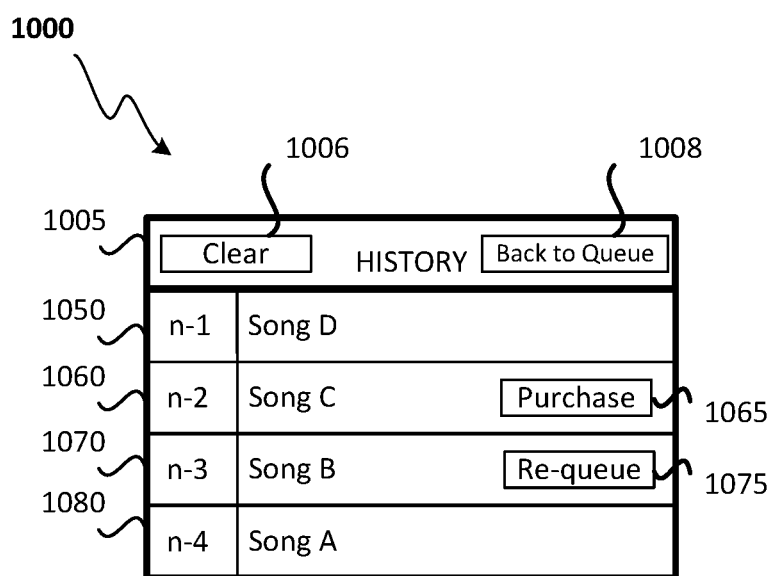

FIGS. 10a and 10b illustrate an example of a queue with a history list. The exemplary queue can be presented on a graphical user interface. Queue 1000 can be similar or substantially similar to queue 900 of FIGS. 9a and 9b, queue 800 of FIGS. 8a and 8b, queue 700 of FIGS. 7a and 7b, queue 600 of FIGS. 6a, 6b, and 6c, queue 500 of FIGS. 5a and 5b, queue 400 of FIGS. 4a and 4b, queue 300 of FIGS. 3a and 3b, and queue 200 of FIGS. 2a and 2b. As shown in FIG. 10a, queue 1000 includes songs 1010, 1020, 1030, and 1040. The songs are in position n+1, n+2, n+3, and n+4, respectively, where n is the currently playing song. Queue 1000 can include header 1001 and banner 1003. The header 1001 can be configured to display buttons for various options of queue 1000. For example, header 1001 can include clear button 1002 which clears the queue and history button 1004 which shows the history list of queue 1000. Banner 1003 can be configured to notify the user that four queued songs are scheduled for playback. In some examples, banner 1003 can also provide additional information on the next song scheduled to play. In some examples, the buttons can be configured to remain hidden until the cursor rolls over header 1001. In other examples, a button can be configured to remain fixed on header 1001.

FIG. 10b illustrates an example of queue 1000 of FIG. 10a after the user has selected to view the history list. This can occur when the user toggles history button 1004 of queue 1000. As shown, queue 1000 now displays header 1005. Header 1005 includes the text "HISTORY" to notify the user that the history list is currently being displayed instead of the queue. Header 1005 can include clear button 1006, which clears the history, and back to queue button 1008 to return back to the queue. Songs 1050, 1060, 1070, and 1080 are presented in the history list. As shown, the songs appear sequentially based on playback order with the most recently played song on the top and the least recently played song on the bottom. Action items that can be performed on a song can be presented next to the song. For example, song 1060 can include purchase button 1065 to purchase the song. Similarly song 1070 can include re-queue button 1075 to re-queue the song. The song can be re-queued as "play now", "play next", or "add to queue" depending on the user's selection or default settings. The action items available to a user can depend on the status of the song. For example, the purchase button may not be available for songs that already exist in the user's media library. In some examples, songs in the history cannot be dragged and dropped to alter the order that the songs appear in the history list.

In one embodiment, the source of the song can affect the way the song is presented in the history list. For example, radio stations can be presented differently in the history list and the queue than other sources. A radio station can appear in the queue without specifics on the song that will be played. When the radio station is moved to the currently playing song, the name of the song is presented to the user. After the song has played, the song enters the history list. In the history list, the name of the song appears along with an option to purchase the song. The option to re-queue the song may not be provided to the user until the user owns a copy of the song.

Queue Sharing for Multiple Devices

In one embodiment, a queue on a host device can be accessed by multiple client devices. Each client device can view the queue and optionally, edit the queue by adding songs, playlists, or other collections of music into the queue. In one example, a voting option is presented where the multiple client devices can vote on songs. Songs that meet certain voting criteria (such as minimum number of votes, minimum number of likes, or minimum average voting score) can be promoted in the queue to play next. In one example, songs promoted in the queue have a queue status field set as manually entered while other songs entered by the multiple client devices have a queue status field set as automatically entered. This allows only songs that are desirable by the community to be promoted up the queue. In another example, statistics from the voting can be used to analyze the songs in the queue. The statistics can be used to provide additional options to the users, such as "play highest ranked songs more often."

Methods

Figure 11:
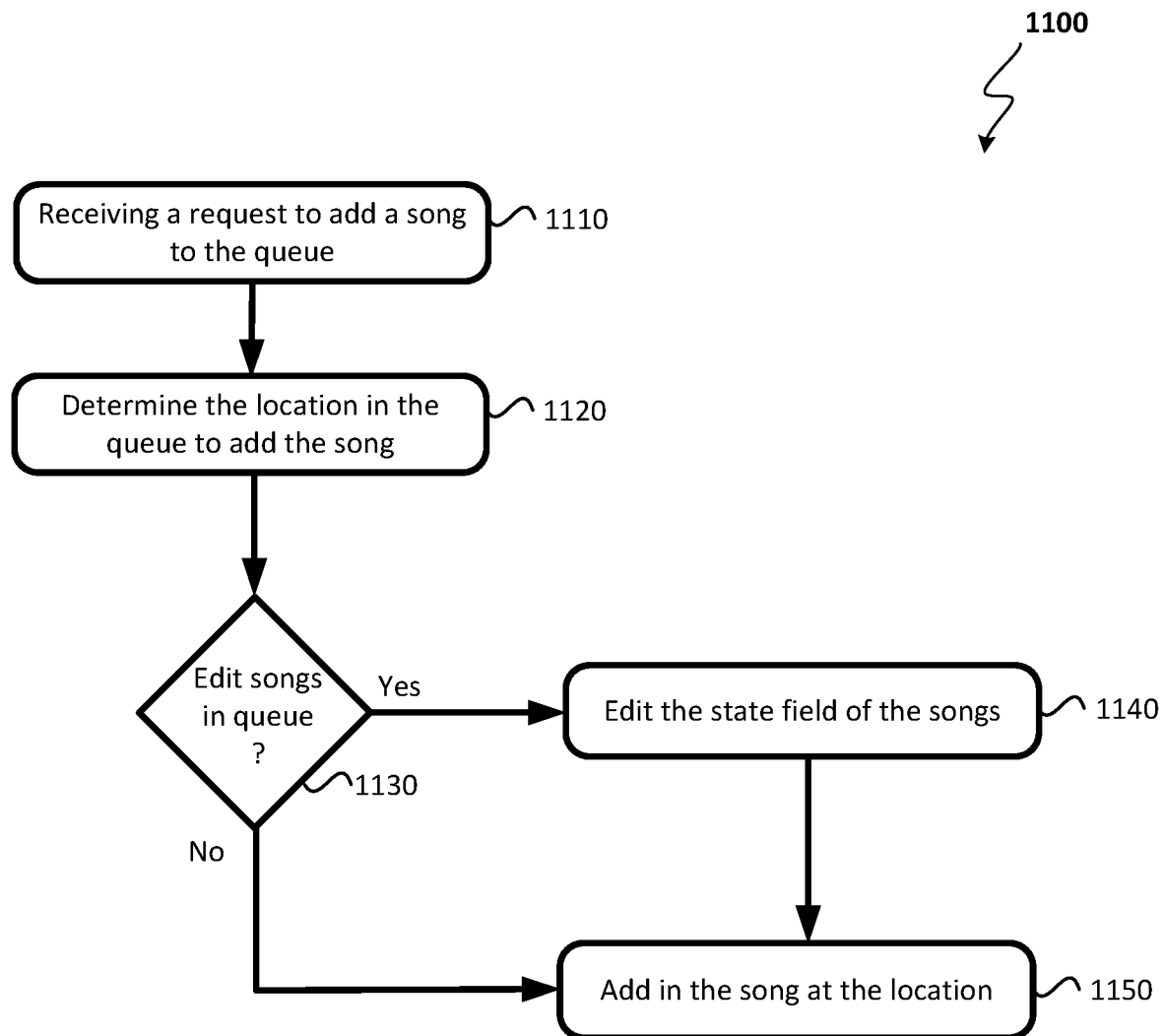
FIG. 11 illustrates an exemplary method for adding a song to a location in the queue.

FIG. 11 illustrates an exemplary method for adding a song to a location in the queue. Process 1100 begins by receiving a request to add a song to the queue (1110). After the song is received, a determination is made as to the location in the queue the requester wishes to add the song (1120). Once the desired location in the queue is determined, a query is performed to determine if it is necessary to edit songs in the queue (1130). It one example, songs in the queue can be edited when there are songs above the song being added into the queue. In another example, songs in the queue can be edited when the queue is in a passive playback mode. If a determination is made that the songs in the queue are to be edited, process 1100 can continue to edit the state field of the songs (1140) and subsequently add the new song into the queue (1150). Alternatively if there is no need to edit songs in the queue, the song can be added to the desired location (1150).

Figure 12:
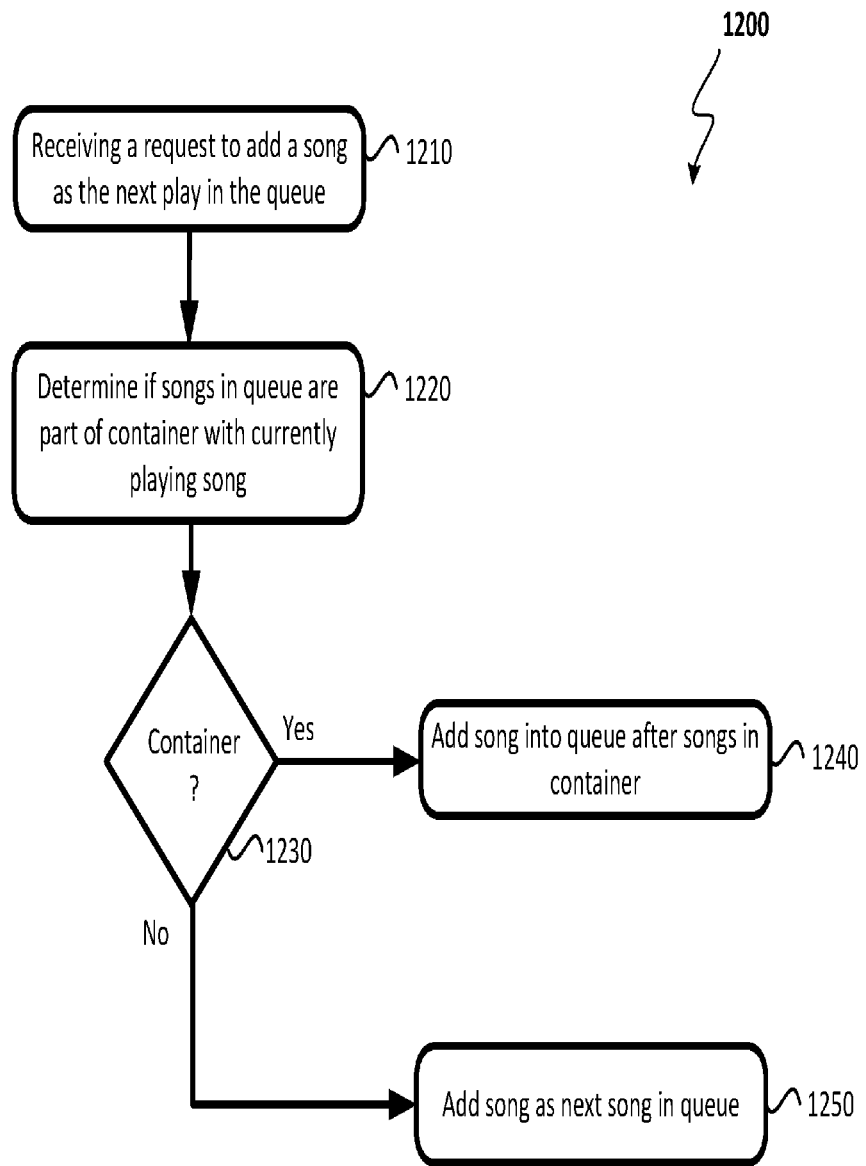
FIG. 12 illustrates an exemplary method for adding a song as a next song in the queue.

FIG. 12 illustrates an exemplary method for adding a song as a next song in the queue. Process 1200 begins by receiving a request to add a song as the next song in the queue (1210). Process 1200 can then determine if one or more songs in the queue are part of a container with the currently playing song (1220). If one or more songs in the queue are part of the container (1230), then the song is added into the queue after the songs in the container (1240). Alternatively if none of the songs are part of the container (1230), then the song is added as the next song in the queue (1250).

Exemplary User Interface

Figure 13:
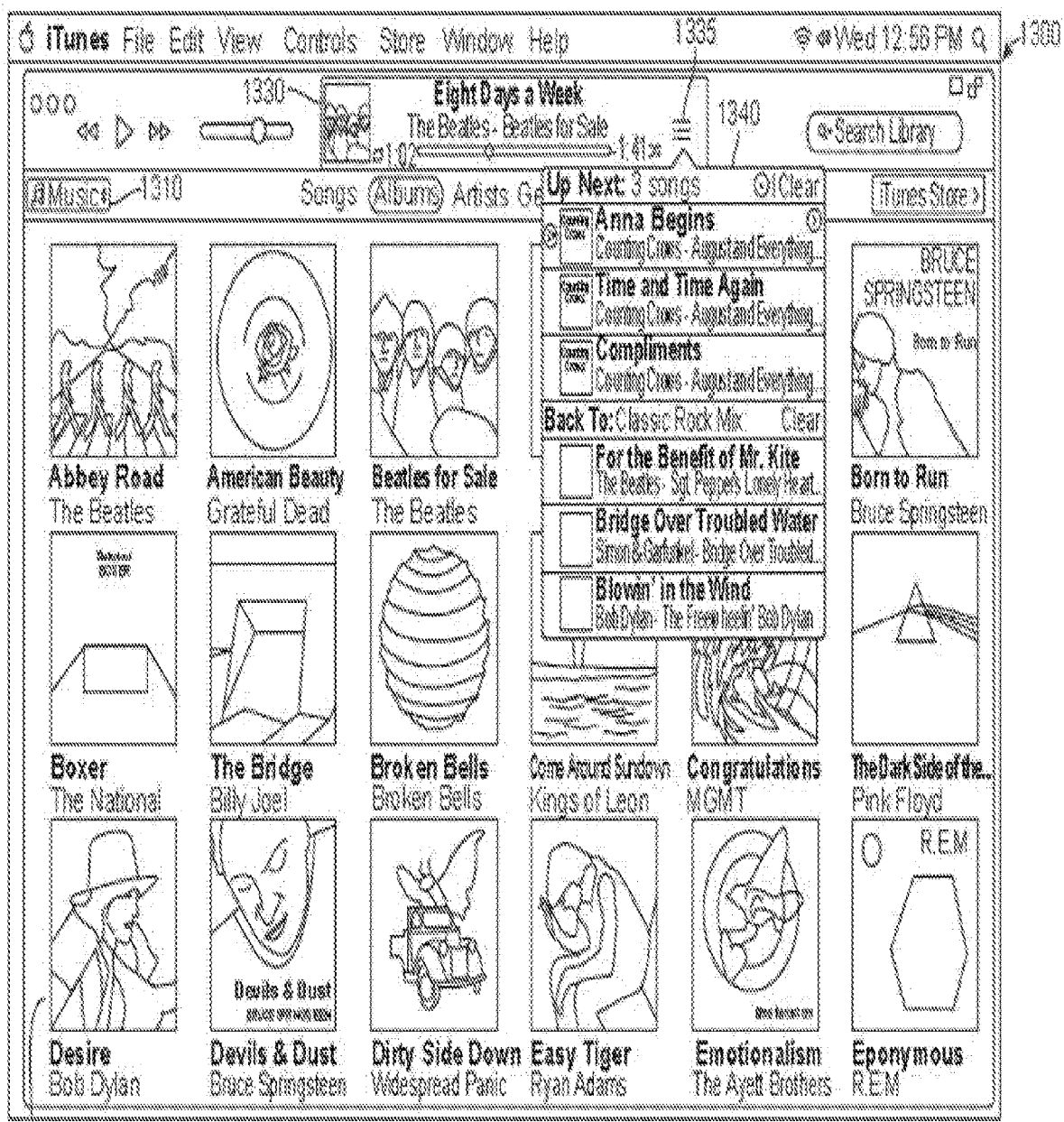
FIG. 13 illustrates an exemplary user interface of a media playback application.

FIG. 13 illustrates an exemplary user interface of the media playback application. As shown, user interface 1300 includes content selector 1310 configured to select the source of content, browser window 1320 configured to present the digital media available from the source, currently playing bar 1330 configured to present the currently playing digital media, queue 1340, and toggle switch 1335 configured to toggle on and off the presentation of queue 1340.

Figure 14:
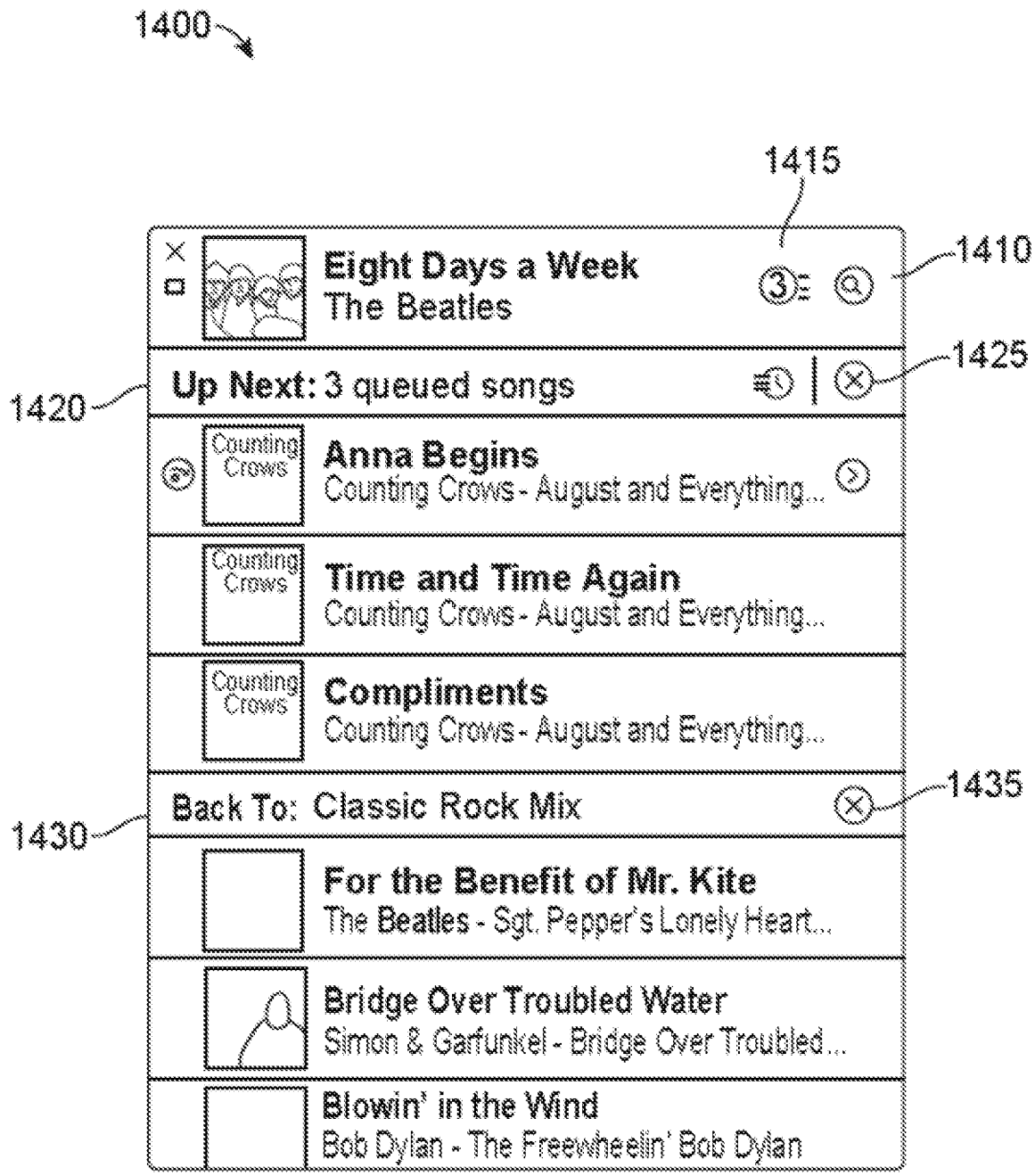
FIG. 14 illustrates an exemplary mini player user interface of a media playback application.

FIG. 14 illustrates an exemplary mini player user interface of the media playback application. As shown, user interface 1400 includes currently playing bar 1410, which includes toggle 1415. Toggle 1415 can be configured to toggle the presentation of the queue. Toggle 1415 can also be configured to display the number of queued songs before playback returns to normal playback mode. User interface 1400 also includes banner 1420 configured to present information about upcoming songs that are queued. Banner 1420 can include clear button 1425 configured to clear the songs in this section. User interface 1400 also includes banner 1430 configured to present information regarding the songs in normal playback mode. For example, banner 1430 can present the name of the playlist that the media playback application returns to after queued songs have been played. Banner 1435 can also include clear button 1435 configured to clear the playlist from the queue.

General System

Figure 15:
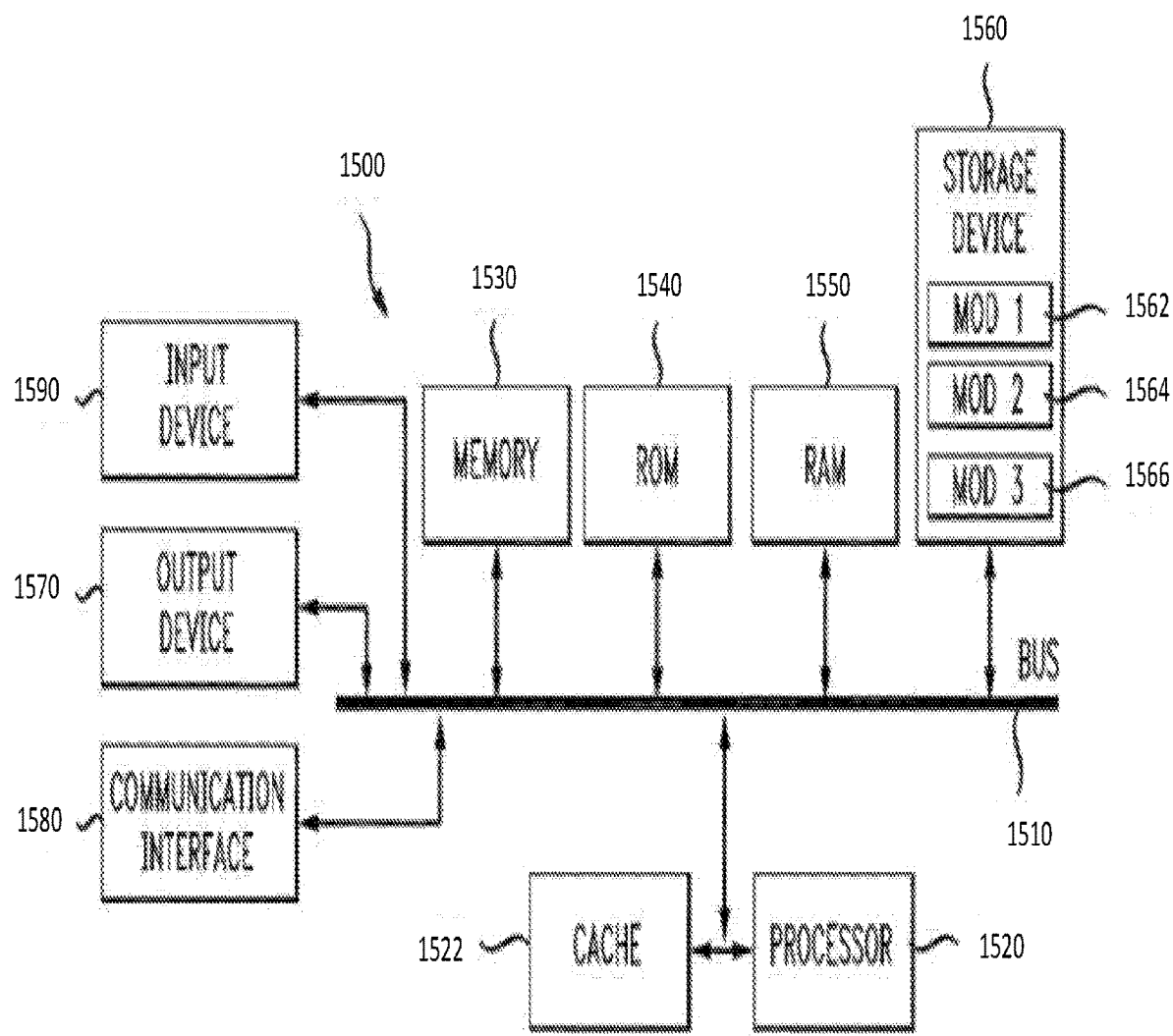
FIG. 15 illustrates an exemplary system.

A general computing device can be configured to store and execute the media playback application. With reference to FIG. 15, an exemplary system 1500 includes a general-purpose computing device 1500, including a processing unit (CPU or processor) 1520 and a system bus 1510 that couples various system components including the system memory 1530 such as read only memory (ROM) 1540 and random access memory (RAM) 1550 to the processor 1520. The system 1500 can include a cache 1522 of high speed memory connected directly with, in close proximity to, or integrated as part of the processor 1520. The system 1500 copies data from the memory 1530 and/or the storage device 1560 to the cache 1522 for quick access by the processor 1520. In this way, the cache provides a performance boost that avoids processor 1520 delays while waiting for data. These and other modules can control or be configured to control the processor 1520 to perform various actions. Other system memory 1530 may be available for use as well. The memory 1530 can include multiple different types of memory with different performance characteristics. It can be appreciated that the disclosure may operate on a computing device 1500 with more than one processor 1520 or on a group or cluster of computing devices networked together to provide greater processing capability. The processor 1520 can include any general purpose processor and a hardware module or software module, such as module 1 1562, module 2 1564, and module 3 1566 stored in storage device 1560, configured to control the processor 1520 as well as a special-purpose processor where software instructions are incorporated into the actual processor design. The processor 1520 may essentially be a completely self-contained computing system, containing multiple cores or processors, a bus, memory controller, cache, etc. A multi-core processor may be symmetric or asymmetric.

The system bus 1510 may be any of several types of bus structures including a memory bus or memory controller, a peripheral bus, and a local bus using any of a variety of bus architectures. A basic input/output (BIOS) stored in ROM 1540 or the like, may provide the basic routine that helps to transfer information between elements within the computing device 1500, such as during start-up. The computing device 1500 further includes storage devices 1560 such as a hard disk drive, a magnetic disk drive, an optical disk drive, a solid state drive, a tape drive or the like. The storage device 1560 can include software modules 1562, 1564, 1566 for controlling the processor 1520. Other hardware or software modules are contemplated. The storage device 1560 is connected to the system bus 1510 by a drive interface. The drives and the associated computer readable storage media provide nonvolatile storage of computer readable instructions, data structures, program modules and other data for the computing device 1500. In one aspect, a hardware module that performs a particular function includes the software component stored in a non-transitory computer-readable medium in connection with the necessary hardware components, such as the processor 1520, bus 1510, display

1570, and so forth, to carry out the function. The basic components are known to those of skill in the art and appropriate variations are contemplated depending on the type of device, such as whether the device 1500 is a small, handheld computing device, a desktop computer, or a computer server.

Although the exemplary embodiment described herein employs the hard disk 1560, it should be appreciated by those skilled in the art that other types of computer readable media which can store data that are accessible by a computer, such as magnetic cassettes, flash memory cards, digital versatile disks, cartridges, random access memories (RAMs) 1550, read only memory (ROM) 1540, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 1500, an input device 1590 represents any number of input mechanisms, such as a microphone for speech, a touch-sensitive screen for gesture or graphical input, keyboard, mouse, motion input, speech and so forth. An output device 1570 can also be one or more of a number of output mechanisms known to those of skill in the art. In some instances, multimodal systems enable a user to provide multiple types of input to communicate with the computing device 1500. The communications interface 1580 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks, including functional blocks labeled as a "processor" or processor 1520. The functions these blocks represent may be provided through the use of either shared or dedicated hardware, including, but not limited to, hardware capable of executing software and hardware, such as a processor 1520, that is purpose-built to operate as an equivalent to software executing on a general purpose processor. For example, the functions of one or more processors, presented in FIG. 15, may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 1540 for storing software performing the operations discussed below, and random access memory (RAM) 1550 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 1500, shown in FIG. 15, can practice all or part of the recited methods, can be a part of the recited systems, and/or can operate according to instructions in the recited non-transitory computer-readable storage media. Such logical operations can be implemented as modules configured to control the processor 1520 to perform particular functions according to the programming of the module. For example, FIG. 15 illustrates three modules Mod1 1562, Mod2 1564 and Mod3 1566 which are modules configured to control the processor 1520. These modules may be stored on the storage device 1560 and loaded into RAM 1550 or memory 1530 at runtime or may be stored, as would be known in the art, in other computer-readable memory locations. Having disclosed some components of a computing system, the disclosure now turns to a description of cloud computing.

Cloud Computing System

Figure 16:
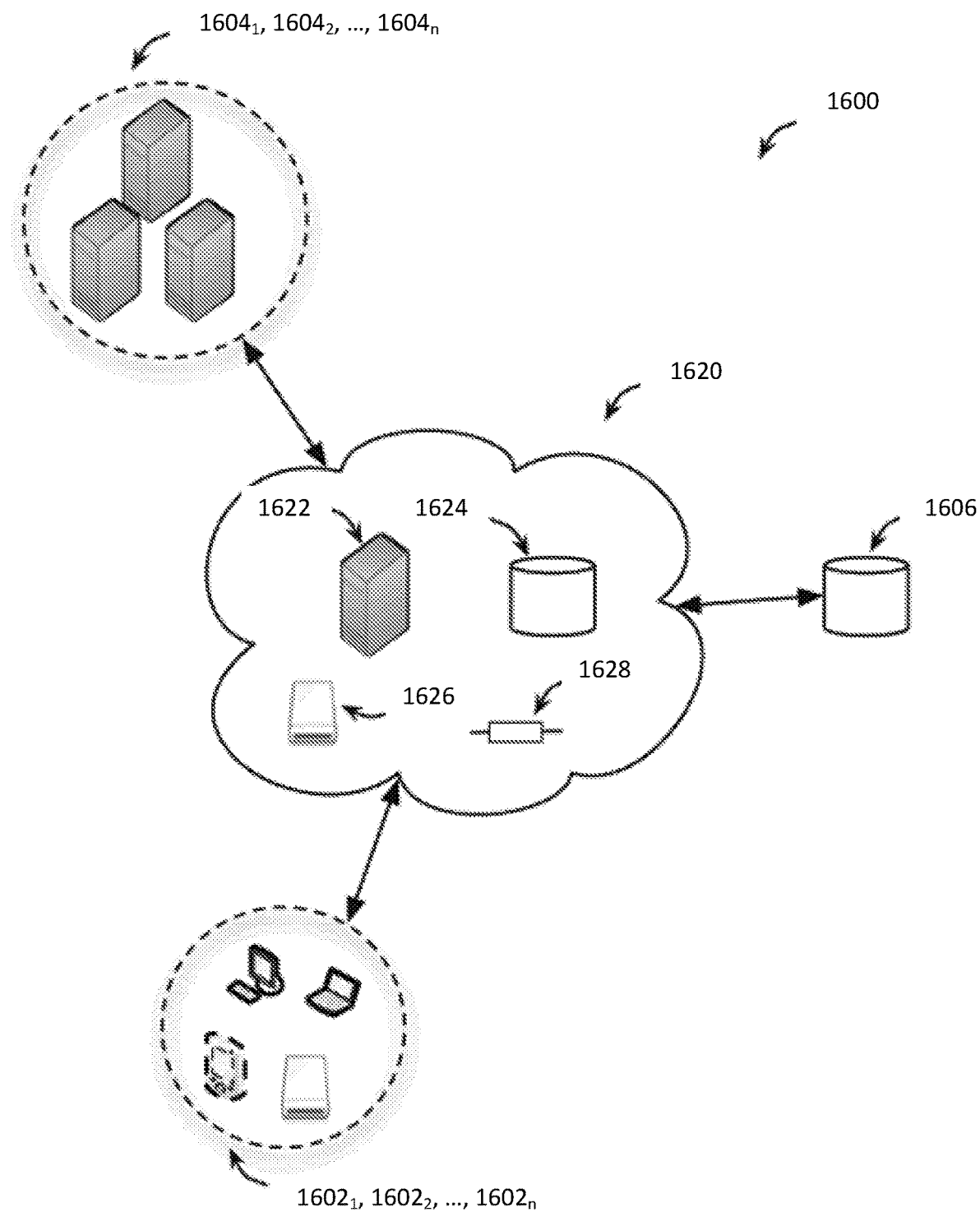
FIG. 16 illustrates an exemplary cloud system.

Cloud computing is a type of Internet-based computing in which a variety of resources are hosted and/or controlled by an entity and made available by the entity to authorized users via the Internet. An exemplary cloud computing system configuration 1600 is illustrated in FIG. 16 wherein a variety of electronic devices can communicate via a network for purposes of exchanging content and other data. The system can be configured for use on a wide variety of network configurations that facilitate the intercommunication of electronic devices. For example, each of the components of system 1600, in FIG. 16, can be implemented in a localized or distributed fashion in a network.

System 1600 can be configured to include cloud computing resources 1620 (i.e., "the cloud"). The cloud resources can include a variety of hardware and/or software resources, such as cloud servers 1622, cloud databases 1624, cloud storage 1626, cloud networks 1628, cloud applications, cloud platforms, and/or any other cloud-based resources. In some cases, the cloud resources are distributed. For example, cloud storage 1626 can include multiple storage devices. In some cases, cloud resources can be distributed across multiple cloud computing systems and/or individual network enabled computing devices. For example, cloud computing resources 1620 can communicate with servers 1604$_1$, 1604$_2$, . . . , 1604$_n$ (collectively "1604"), database 1606, and/or any other network enabled computing device to provide the cloud resources.

Furthermore, in some cases, the cloud resources can be redundant. For example, if cloud computing resources 1620 is configured to provide data backup services, multiple copies of the data can be stored such that the data is still be available to the user even if a storage resource is offline, busy, or otherwise unavailable to process a request. In another example, if cloud computing resources 1620 is configured to provide software, the software can be available from different cloud servers so that the software can be served from any of the different cloud servers. Algorithms can be applied such that the closest server or from the server with the lowest current load is selected to process a given request.

In system 1600, a user interacts with cloud computing resources 1620 through user terminals 1602$_1$, 1602$_2$, . . . , 1602$_n$ (collectively "1602") connected to a network by direct and/or indirect communication. Cloud computing resources 1620 can support connections from a variety of different electronic devices, such as servers; desktop computers; mobile computers; handheld communications devices, e.g., mobile phones, smart phones, tablets; set top boxes; network-enabled hard drives; and/or any other network-enabled computing devices. Furthermore, cloud computing resources 1620 can concurrently accept connections from and interact with multiple electronic devices. Interaction with the multiple electronic devices can be prioritized or occur simultaneously.

Cloud computing resources 1620 can provide cloud resources through a variety of deployment models, such as public, private, community, hybrid, and/or any other cloud deployment model. In some cases, cloud computing resources 1620 can support multiple deployment models. For example, cloud computing resources 1620 can provide one set of resources through a public deployment model and another set of resources through a private deployment model.

In some configurations, a user terminal 1602 can access cloud computing resources 1620 from any location where an Internet connection is available. However, in other cases, cloud computing resources 1620 can be configured to restrict access to certain resources such that a resource can only be accessed from certain locations. For example, if cloud computing resources 1620 is configured to provide a resource using a private deployment model, then cloud computing resources 1620 can restrict access to the resource, such as by requiring that a user terminal 1602 access the resource from behind a firewall.

Cloud computing resources 1620 can provide cloud resources to user terminals 1602 through a variety of service models, such as Software as a Service (SaaS), Platforms as a service (PaaS), Infrastructure as a Service (IaaS), and/or any other cloud service models. In some cases, cloud computing resources 1620 can provide multiple service models to a user terminal 1602. For example, cloud computing resources 1620 can provide both SaaS and IaaS to a user terminal 1602. In some cases, cloud computing resources 1620 can provide different service models to different user terminals 1602. For example, cloud computing resources 1620 can provide SaaS to user terminal $1602_1$ and PaaS to user terminal $1602_2$.

In some cases, cloud computing resources 1620 can maintain an account database. The account database can store profile information for registered users. The profile information can include resource access rights, such as software the user is permitted to use, maximum storage space, etc. The profile information can also include usage information, such as computing resources consumed, data storage location, security settings, personal configuration settings, etc. In some cases, the account database can reside on a database or server remote to cloud computing resources 1620 such as servers 1604 or database 1606.

Cloud computing resources 1620 can provide a variety of functionality that requires user interaction. Accordingly, a user interface (UI) can be provided for communicating with cloud computing resources 1620 and/or performing tasks associated with the cloud resources. The UI can be accessed via an end user terminal 1602 in communication with cloud computing resources 1620. The UI can be configured to operate in a variety of client modes, including a fat client mode, a thin client mode, or a hybrid client mode, depending on the storage and processing capabilities of cloud computing resources 1620 and/or the user terminal 1602. Therefore, a UI can be implemented as a standalone application operating at the user terminal in some embodiments. In other embodiments, a web browser-based portal can be used to provide the UI. Any other configuration to access cloud computing resources 1620 can also be used in the various embodiments.

As described above, in some configurations, the cloud computing resources can be used to store user data. The present disclosure contemplates that, in some instances, this gathered data might include personal and/or sensitive data. The present disclosure further contemplates that the entities responsible for the collection, analysis, disclosure, transfer, storage, or other use of such data should implement and consistently use privacy policies and practices that are, generally recognized, meeting or exceeding industry or governmental requirements for maintaining personal information data private and secure. For example, personal data from users should be collected for legitimate and reasonable uses of the entity and not shared or sold outside of those legitimate uses. Further, such collection should occur only after the informed consent of the users. Additionally, such entities should take any needed steps for safeguarding and securing access to such personal data and ensuring that others with access to the personal data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal data. That is, the present disclosure contemplates that hardware and/or software elements can be provided to prevent or block access to such personal data. For example, the present technology can be configured to allow users to select the data that is stored in cloud storage. In another example, the present technology can also be configured to allow a user to specify the data stored in cloud storage that can be shared with other users.

Therefore, although the present disclosure broadly covers use of personal data to implement one or more various disclosed embodiments, the present disclosure also contemplates that the various embodiments can also be implemented without the need for accessing such personal data. That is, the various embodiments of the present technology are not rendered inoperable due to the lack of all or a portion of such personal data. For example, non-personal data can be stored in cloud storage.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, solid state drives, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied other types of files to control the secure deletion of those files and other copies of those files from storage. Those skilled in the art will readily recognize various modifications and changes that may be made to the principles described herein without following the example embodiments and applications illustrated and described herein, and without departing from the spirit and scope of the disclosure.

We claim:

1. A method comprising:
   initiating display of a graphical user interface depicting a queue and a plurality of selectable content sources separate from the queue;
   receiving a selection of a first content source of the selectable content sources;
   in response to receiving a selection of a first content source of the selectable content sources, adding a plurality of entries associated with media items from the first content source to the queue;
   adding a particular entry corresponding to a particular media item to a particular position in the queue based on input identifying the particular position, wherein a first subset of the plurality of entries precede the particular position in the queue and a second subset of the plurality of entries succeed the particular position in the queue; and
   receiving a selection of a second content source of the selectable content sources;
   in response to receiving the selection of the second content source of the selectable content sources, removing the second subset from the queue while maintaining the first subset in the queue.

2. The method of claim 1, further comprising adding entries to the queue following the particular position based on media items from the second content source in response to the selection of the second content source.

3. The method of claim 1, wherein the first content source corresponds to a first playlist and the second content source corresponds to a second playlist.

4. The method of claim 1, wherein the particular media item is from the first content source.

5. The method of claim 4, wherein the input identifying the particular position corresponds to a command to move the particular entry from a first position in the queue to the particular position.

6. The method of claim 1, wherein the particular media item is from a source distinct from the first content source.

7. A computer readable storage device storing instructions executable by one or more processors to:
   initiate display of a graphical user interface depicting a queue and a plurality of selectable content sources separate from the queue;
   receive a selection of a first content source of the selectable content sources;
   in response to receiving the selection of the first content source of the selectable content sources, add a plurality of entries associated with media items from the first content source to the queue;
   add a particular entry corresponding to a particular media item to a particular position in the queue based on input identifying the particular position, wherein a first subset of the plurality of entries precede the particular position in the queue and a second subset of the plurality of entries succeed the particular position in the queue; and
   in response to receiving a selection of a second content source of the selectable content sources, remove the second subset from the queue while maintaining the first subset in the queue.

8. The computer readable storage device of claim 7, wherein the instructions are further executable by the one or more processors to add entries to the queue following the particular position based on media items from the second content source in response to the selection of the second content source.

9. The computer readable storage device of claim 7, wherein the first content source corresponds to a first playlist and the second content source corresponds to a second playlist.

10. The computer readable storage device of claim 7, wherein the instructions are further executable by the one or more processors to remove a first entry of the first subset from the queue responsive to a skip command.

11. The computer readable storage device of claim 7, wherein the particular media item is from the first content source.

12. The computer readable storage device of claim 11, wherein the input identifying the particular position corresponds to a command to move the particular entry from a first position in the queue to the particular position.

13. The computer readable storage device of claim 7, wherein the particular media item is from a source distinct from the first content source.

14. An apparatus comprising:
   a display device;
   one or more processors; and
   a memory storing instructions executable by the one or more processors to:
      initiate display, via the display device, of a graphical user interface depicting a queue and a plurality of selectable content sources separate from the queue;
      receive a selection of a first content source of the selectable content sources;
      in response to receiving the selection of the first content source of the selectable content sources, add a plurality of entries associated with media items from the first content source to the queue;

add a particular entry corresponding to a particular media item to a particular position in the queue based on input identifying the particular position, wherein a first subset of the plurality of entries precede the particular position in the queue and a second subset of the plurality of entries succeed the particular position in the queue;

receive a selection of a second content source of the selectable content sources; and in response to receiving the selection of the second content source of the selectable content sources, remove the second subset from the queue while maintaining the first subset in the queue.

15. The apparatus of claim 14, wherein the instructions are further executable by the one or more processors to add entries to the queue following the particular position based on media items from the second content source in response to the selection of the second content source.

16. The apparatus of claim 14, wherein the first content source corresponds to a first playlist and the second content source corresponds to a second playlist.

17. The apparatus of claim 14, wherein the instructions are further executable by the one or more processors to remove a first entry of the first subset from the queue responsive to a skip command.

18. The apparatus of claim 14, wherein the particular media item is from the first content source.

19. The apparatus of claim 18, wherein the input identifying the particular position corresponds to a command to move the particular entry from a first position in the queue to the particular position.

20. The apparatus of claim 14 wherein the particular media item is from a source distinct from the first content source.

* * * * *